(12) United States Patent
Zewail et al.

(10) Patent No.: US 11,638,203 B2
(45) Date of Patent: Apr. 25, 2023

(54) DIFFERENTIATING BETWEEN SYNCHRONIZATION SIGNAL BLOCK TRANSMISSION IN A LICENSED OPERATING MODE AND AN UNLICENSED OPERATING MODE

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Jing Sun, San Diego, CA (US); Srinivas Yerramalli, Hyderabad (IN); Zhifei Fan, San Diego, CA (US); Wooseok Nam, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/155,376

(22) Filed: Jan. 22, 2021

(65) Prior Publication Data

US 2021/0266823 A1 Aug. 26, 2021

Related U.S. Application Data

(60) Provisional application No. 62/979,180, filed on Feb. 20, 2020.

(51) Int. Cl.
| | | |
|---|---|---|
| *H04W 48/16* | (2009.01) | |
| *H04W 88/06* | (2009.01) | |
| *H04W 16/14* | (2009.01) | |
| *H04L 27/26* | (2006.01) | |
| *H04W 48/18* | (2009.01) | |
| *H04W 72/04* | (2023.01) | |
| *H04W 36/00* | (2009.01) | |

(52) U.S. Cl.
CPC ......... *H04W 48/16* (2013.01); *H04L 27/2675* (2013.01); *H04W 16/14* (2013.01); *H04W 36/0066* (2013.01); *H04W 48/18* (2013.01); *H04W 72/042* (2013.01); *H04W 88/06* (2013.01)

(58) Field of Classification Search
CPC combination set(s) only.
See application file for complete search history.

(56) References Cited

U.S. PATENT DOCUMENTS

| | | | |
|---|---|---|---|
| 10,264,477 B2 * | 4/2019 | Amini | H04W 24/02 |
| 11,368,930 B2 * | 6/2022 | Kim | H04J 11/0069 |
| 11,399,356 B2 * | 7/2022 | Akkarakaran | H04W 64/00 |

(Continued)

FOREIGN PATENT DOCUMENTS

| | | | | |
|---|---|---|---|---|
| WO | WO-2019048483 A1 * | 3/2019 | | H04L 27/2613 |
| WO | WO-2020063428 A1 * | 4/2020 | | H04L 5/0044 |

*Primary Examiner* — Julio R Perez
(74) *Attorney, Agent, or Firm* — Harrity & Harrity LLP

(57) ABSTRACT

Various aspects of the present disclosure generally relate to wireless communication. In some aspects, a user equipment (UE) may determine an operating mode associated with synchronization signal block (SSB) transmission in a band, wherein the operating mode is one of a licensed operating mode or an unlicensed operating mode; and receive one or more SSBs based at least in part on the operating mode. Numerous other aspects are described.

30 Claims, 17 Drawing Sheets

(56) References Cited

U.S. PATENT DOCUMENTS

| | | | |
|---|---|---|---|
| 11,399,373 B2* | 7/2022 | Si | H04W 72/1252 |
| 2004/0259546 A1* | 12/2004 | Balachandran | H04W 84/12 |
| | | | 455/435.2 |
| 2018/0192383 A1* | 7/2018 | Nam | H04W 56/001 |
| 2021/0014805 A1* | 1/2021 | Tang | H04W 56/001 |
| 2021/0266823 A1* | 8/2021 | Zewail | H04W 16/14 |

* cited by examiner

DIFFERENTIATING BETWEEN SYNCHRONIZATION SIGNAL BLOCK TRANSMISSION IN A LICENSED OPERATING MODE AND AN UNLICENSED OPERATING MODE

CROSS-REFERENCE TO RELATED APPLICATION

This patent application claims priority to U.S. Provisional Patent Application No. 62/979,180, filed on Feb. 20, 2020, entitled "DIFFERENTIATING BETWEEN SYNCHRONIZATION SIGNAL BLOCK TRANSMISSION IN A LICENSED OPERATING MODE AND AN UNLICENSED OPERATING MODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for differentiating between synchronization signal block transmission in a licensed operating mode and an unlicensed operating mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining an operating mode associated with synchronization signal block (SSB) transmission in a band, wherein the operating mode is one of a licensed operating mode or an unlicensed operating mode; and receiving one or more SSBs based at least in part on the operating mode.

In some aspects, a method of wireless communication, performed by a base station, may include determining an operating mode associated with SSB transmission in a band, wherein the operating mode is one of a licensed operating mode or an unlicensed operating mode; and transmitting one or more SSBs based at least in part on the operating mode.

In some aspects, a UE for wireless communication may include a memory and one or more processors operatively coupled to the memory. The memory and the one or more processors may be configured to determine an operating mode associated with SSB transmission in a band, wherein the operating mode is one of a licensed operating mode or an unlicensed operating mode; and receive one or more SSBs based at least in part on the operating mode.

In some aspects, a base station for wireless communication may include a memory and one or more processors operatively coupled to the memory. The memory and the one or more processors may be configured to determine an operating mode associated with SSB transmission in a band, wherein the operating mode is one of a licensed operating mode or an unlicensed operating mode; and transmit one or more SSBs based at least in part on the operating mode.

In some aspects, a non-transitory computer-readable medium may store one or more instructions for wireless communication. The one or more instructions, when executed by one or more processors of a UE, may cause the one or more processors to determine an operating mode associated with SSB transmission in a band, wherein the operating mode is one of a licensed operating mode or an unlicensed operating mode; and receive one or more SSBs based at least in part on the operating mode.

In some aspects, a non-transitory computer-readable medium may store one or more instructions for wireless communication. The one or more instructions, when executed by one or more processors of a base station, may cause the one or more processors to determine an operating mode associated with SSB transmission in a band, wherein the operating mode is one of a licensed operating mode or an unlicensed operating mode; and transmit one or more SSBs based at least in part on the operating mode.

In some aspects, an apparatus for wireless communication may include means for determining an operating mode associated with SSB transmission in a band, wherein the operating mode is one of a licensed operating mode or an unlicensed operating mode; and means for receiving one or more SSBs based at least in part on the operating mode.

In some aspects, an apparatus for wireless communication may include means for determining an operating mode associated with SSB transmission in a band, wherein the operating mode is one of a licensed operating mode or an unlicensed operating mode; and means for transmitting one or more SSBs based at least in part on the operating mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings or the same drawing may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
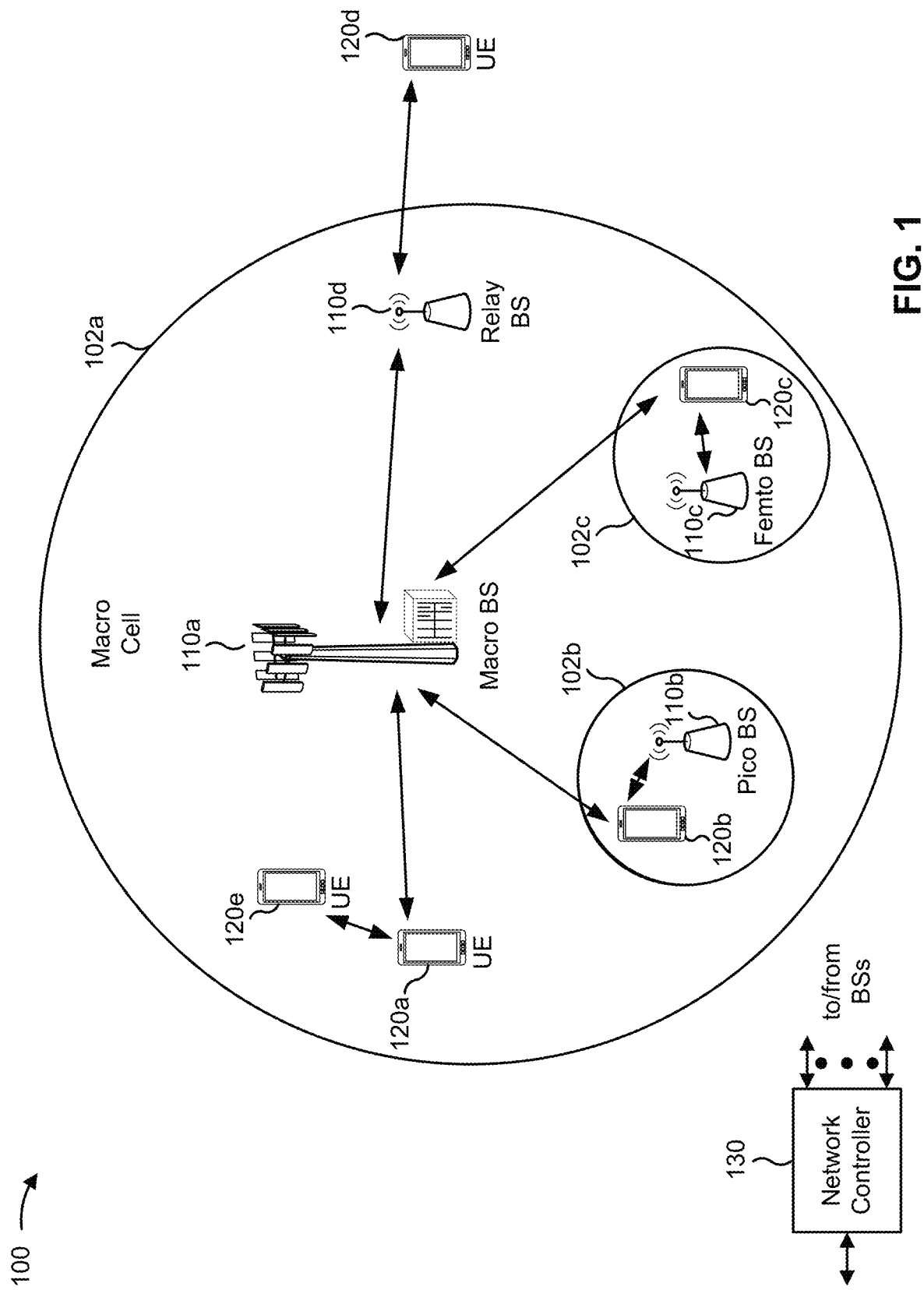
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
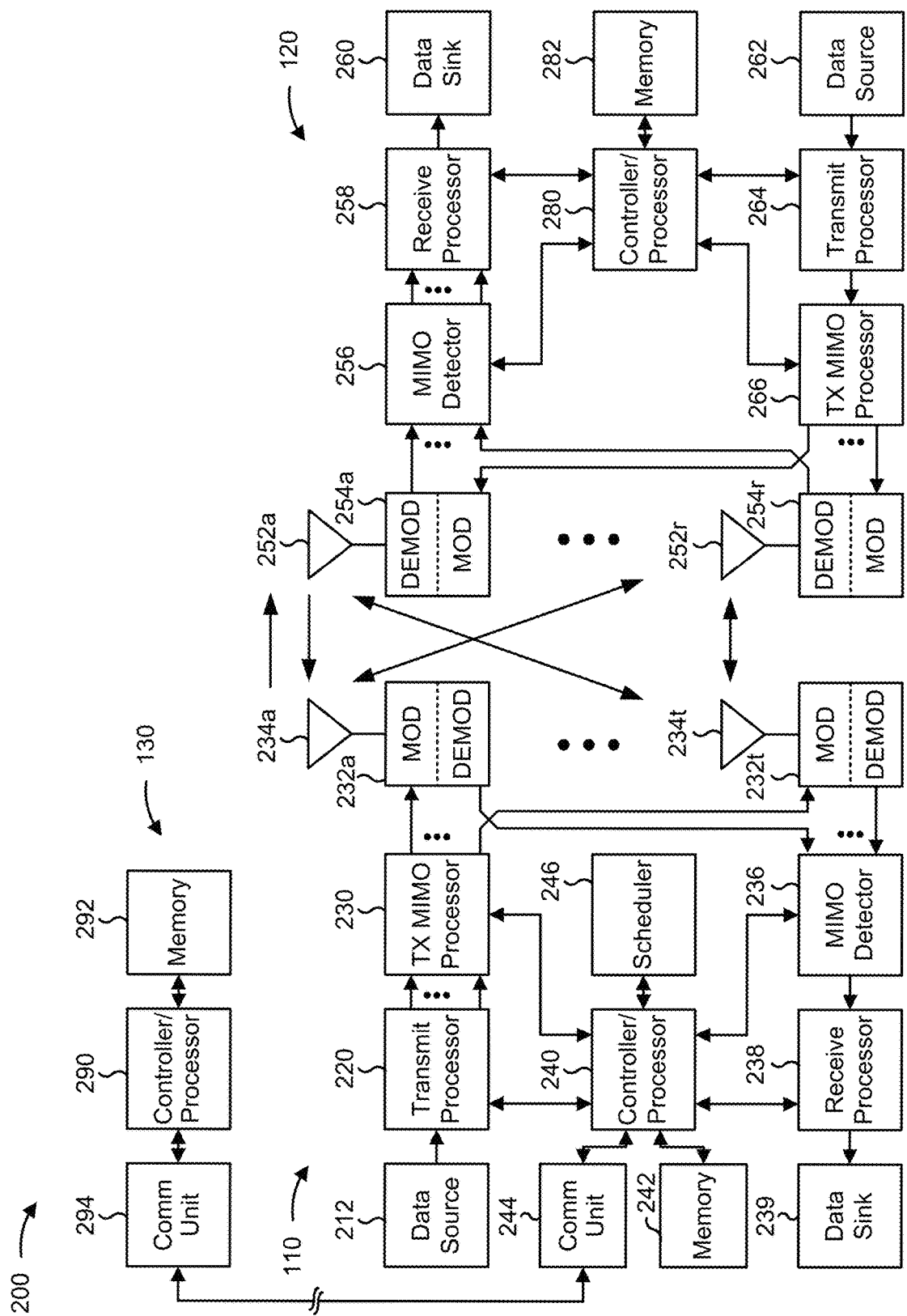
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM. CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with differentiating between synchronization signal block transmission in a licensed operating mode and an unlicensed operating mode, as described in more detail elsewhere herein. For example, controller/processor 240 of base station 110, controller/processor 280 of UE 120, and/or any other component(s) of FIG. 2 may perform or direct operations of, for example, process 1600 of FIG. 16, process 1700 of FIG. 17, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1600 of FIG. 16, process 1700 of FIG. 17, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining an operating mode associated with SSB transmission in a band, wherein the operating mode is one of a licensed operating mode or an unlicensed operating mode; means for receiving one or more SSBs based at least in part on the operating mode; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining an operating mode associated with SSB transmission in a band, wherein the operating mode is one of a licensed operating mode or an unlicensed operating mode; means for transmitting one or more SSBs based at least in part on the operating mode; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
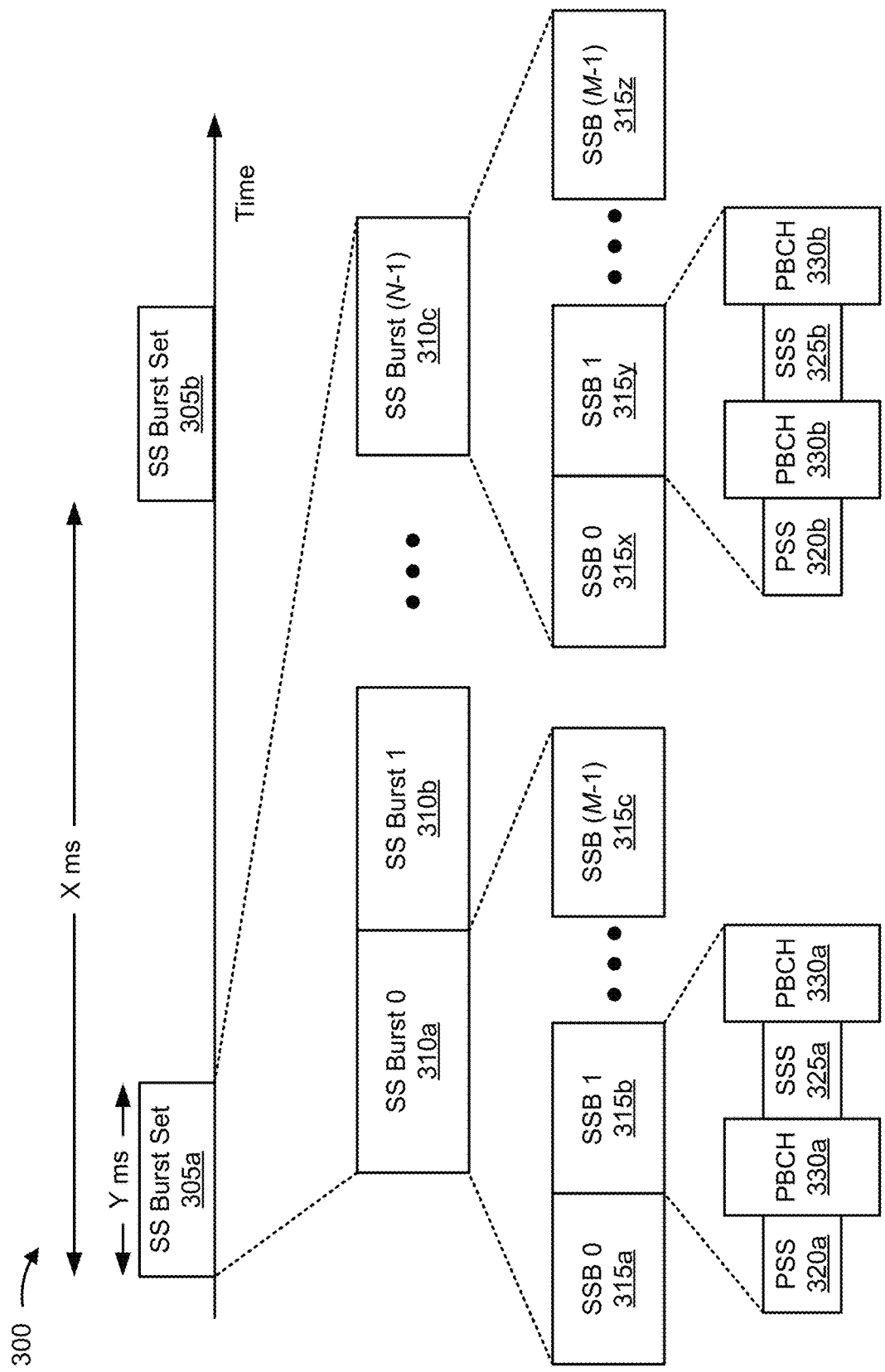
FIG. 3 is a diagram illustrating an example of a synchronization signal (SS) hierarchy, in accordance with various aspects of the present disclosure.

FIG. 3 is a diagram illustrating an example 300 of a synchronization signal (SS) hierarchy, in accordance with various aspects of the present disclosure. As shown in FIG. 3, the SS hierarchy may include an SS burst set 305 (e.g., SS burst set 305a, 305b, etc.), which may include multiple SS bursts 310 (e.g., SS burst 310a, 310b, 310c, etc.), shown as SS burst 0 through SS burst N−1, where N is a maximum number of repetitions of the SS burst 310 that may be transmitted by the base station. As further shown, each SS burst 310 may include one or more SS blocks (SSBs) 315 (e.g., SSBs 315a, 315b, 315c, 315x, 315y. 315z, etc.), shown as SSB 0 through SSB M−1, where M is a maximum number of SSBs 315 that can be carried by an SS burst 310. In some aspects, different SSBs 315 may be beam-formed differently (e.g., transmitted using different beams), and may be used for beam management, beam selection, and/or the like (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window, an SSB measurement time configuration (SMTC) window, and/or the like.

In some aspects, an SSB 315 may include resources that carry a primary synchronization signal (PSS) 320 (e.g., PSS 320a, 320b, etc.), a secondary synchronization signal (SSS) 325 (e.g., SSS 325a. 325b, etc.), a physical broadcast channel (PBCH) 330 (e.g., PBCH 330a, 330b, etc.), and/or the like. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE may monitor for and/or measure SSBs 315 using different receive (Rx) beams during an initial network access procedure. Based at least in part on the monitoring and/or measuring, the UE may indicate one or more SSBs 315 with a best signal parameter (e.g., a reference signal received power (RSRP) parameter and/or the like) to a base station 110. The base station 110 and the UE may use the one or more indicated SSBs 315 to select one or more beams to be used for communication between the base station 110 and the UE (e.g., for a random access channel (RACH) procedure and/or the like). Additionally, or alternatively, the UE may use the SSB 315 and/or the SSB index to determine a cell timing for a cell via which the SSB 315 is received (e.g., a serving cell), as described in more detail below.

As indicated above, FIG. 3 is provided as an example. Other examples may differ from what is described with regard to FIG. 3.

Figure 4:
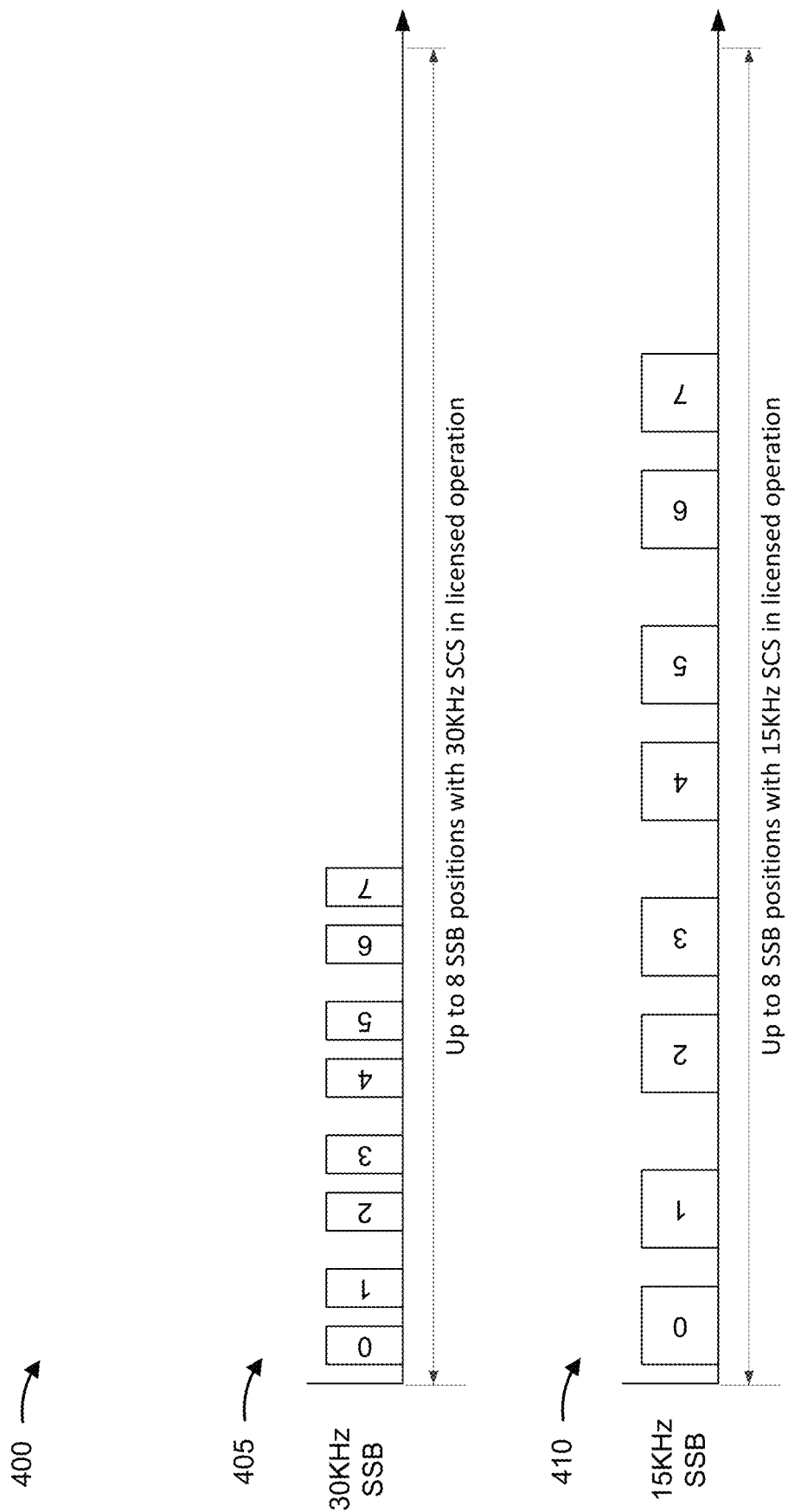
FIG. 4 is a diagram illustrating an example of candidate synchronization signal block (SSB) positions in a licensed radio frequency spectrum band, in accordance with various aspects of the present disclosure.

FIG. 4 is a diagram illustrating an example 400 of candidate SSB positions in a licensed radio frequency spectrum band, in accordance with various aspects of the present disclosure. A licensed radio frequency spectrum band may be referred to herein as a licensed band, and may include a band that is reserved for licensed use, a band that is operating in a licensed operating mode, and/or the like.

As an example, the licensed band may include one or more radio frequencies (e.g., one or more radio frequency spectrum bands) included in the radio spectrum (e.g., the portion of the electromagnetic spectrum corresponding to radio frequencies, or frequencies lower than approximately 300 gigahertz (GHz)). In some aspects, the licensed band may include one or more bands that are reserved for a mobile network operator, or that are otherwise not open for shared use by any device. Devices that operate in a licensed band (e.g., UEs, base stations, and/or the like) do not need to contend for access to the unlicensed band prior to gaining access to and/or communicating over the unlicensed band (e.g., do not need to perform a listen before talk (LBT) procedure to contend for access to the licensed band). In some aspects, the licensed band may be a sub-6 gigahertz band (e.g., a frequency range 1, or FR1, band).

Because devices operating in a licensed band do not need to contend for channel access, a smaller number of candidate SSB positions may be used in a licensed band as compared to an unlicensed band to conserve signaling overhead on the licensed band. For example, a DRS transmission window in a licensed band may include 8 candidate SSB positions, as shown in FIG. 4. A candidate SSB position is a position (e.g., in the time domain) in which an SSB may be (e.g., is permitted or allowed to be) transmitted (regardless of whether an SSB is actually transmission in that position).

As shown by reference number 405, in a licensed band with a sub-carrier spacing (SCS) of 30 kilohertz (kHz), there may be 8 candidate SSB positions in a 5 millisecond DRS transmission window. These SSBs may have 8 possible SSB index values (e.g., from 0 to 7, shown in parenthesis, and each of which may represent a different quasi co-location characteristics for a corresponding SSB), and those index values may not be repeated in different SSB candidate positions in the DRS transmission window in the licensed band. In this way, signaling overhead, associated with SSB transmission in a DRS transmission window, is reduced in a licensed band as compared to an unlicensed band (described below in connection with FIG. 5).

As shown by reference number 410, in a licensed band with an SCS of 15 kHz, there may also be 8 candidate SSB positions in a 5 millisecond DRS transmission window. These SSBs may have 8 possible SSB index values (e.g., from 0 to 7, shown in parenthesis), and those index values may not be repeated in different SSB candidate positions in the DRS transmission window in the licensed band. In this way, signaling overhead may be reduced in the licensed band as compared to an unlicensed band.

In example 400, the DRS transmission window has a duration of 5 milliseconds, which may be the maximum DRS transmission window duration. In some aspects, the DRS transmission window may have a duration of 0.5 milliseconds, 1 millisecond, 2 milliseconds, 3 milliseconds, 4 milliseconds, or 5 milliseconds, among other examples. In some aspects, a UE may assume a DRS transmission window duration of 5 milliseconds unless the UE receives an indication otherwise. In example 400, the maximum number of candidate SSB positions within a DRS transmission window is 8 for a 15 kHz SCS, and is 8 for a 30 kHz SCS.

As indicated above, FIG. 4 is provided as an example. Other examples may differ from what is described with regard to FIG. 4.

Figure 5:
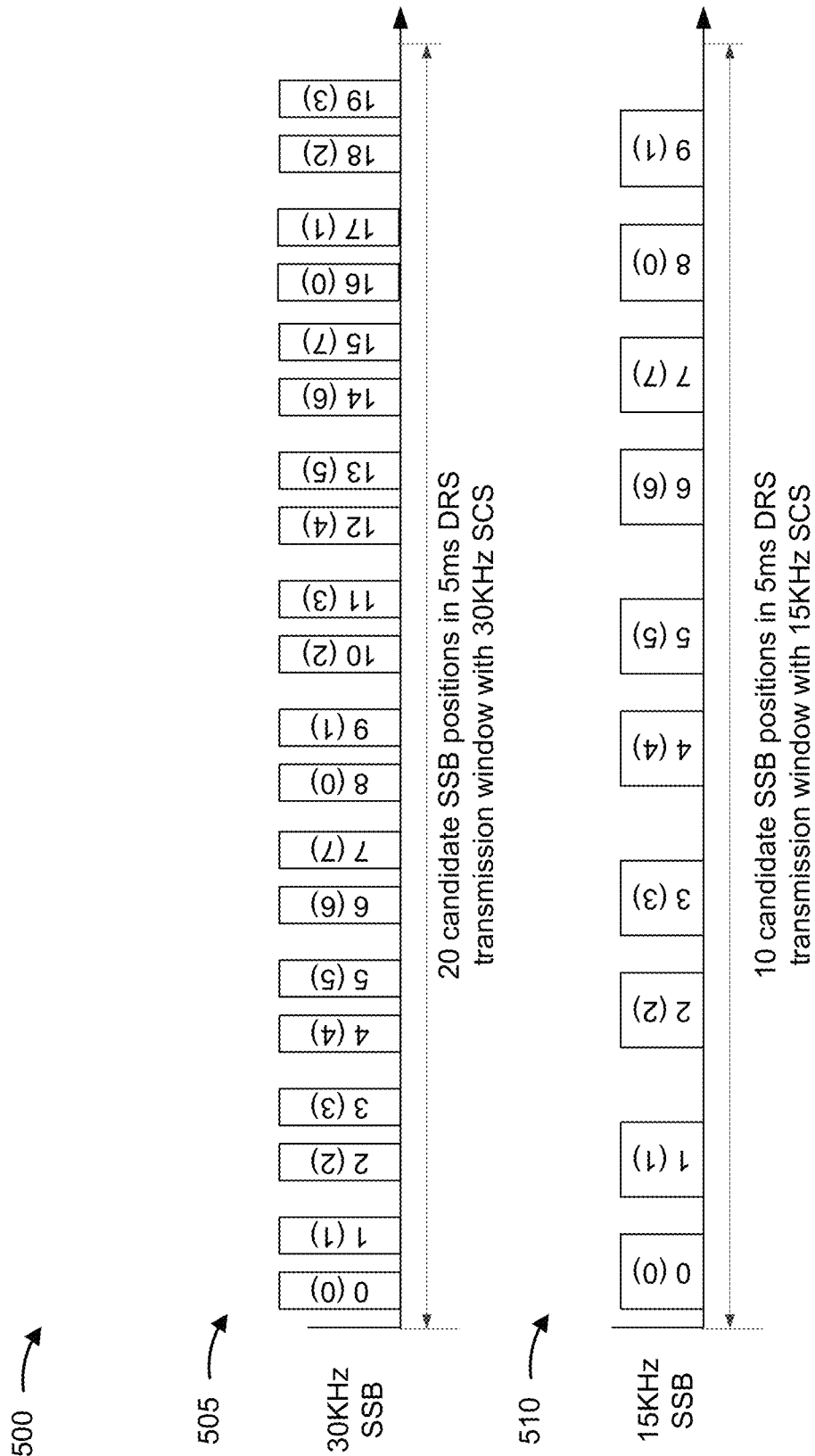
FIG. 5 is a diagram illustrating an example of candidate SSB positions in an unlicensed radio frequency spectrum band, in accordance with various aspects of the present disclosure.

FIG. 5 is a diagram illustrating an example 500 of candidate SSB positions in an unlicensed radio frequency spectrum band, in accordance with various aspects of the present disclosure. An unlicensed radio frequency spectrum band may be referred to herein as an unlicensed band, and may include a band that is reserved for shared or unlicensed use, a band that is reserved for licensed use but that is operating in an unlicensed operating mode, and/or the like.

As an example, the unlicensed band may include one or more radio frequencies (e.g., one or more radio frequency spectrum bands) included in the radio spectrum (e.g., the portion of the electromagnetic spectrum corresponding to radio frequencies, or frequencies lower than approximately 300 GHz). In some aspects, the unlicensed band may include one or more bands that are open for shared use by any device that complies with regulatory agency rules (e.g., associated with a particular country) for communicating via the one or more bands. For example, the unlicensed band may include one or more radio frequencies between approximately 5 GHz and approximately 6 GHz. As a more specific example, the unlicensed band may include one or more radio frequencies between approximately 5.15 GHz and approximately 5.825 GHz.

As another example, the unlicensed band may include one or more bands defined by the United States Federal Communications Commission (FCC) as the Unlicensed National Information Infrastructure (U-NII) radio band. The U-NII radio band may include, for example, a first band between approximately 5.15 GHz and approximately 5.25 GHz (e.g., the U-Nil Low band), a second band between approximately 5.25 GHz and approximately 5.35 GHz (e.g., the U-NII Mid band), a third band between approximately 5.47 GHz and approximately 5.725 GHz (e.g., the U-NII Worldwide band), and/or a fourth band between approximately 5.725 GHz and approximately 5.825 GHz (e.g., the U-NII Upper band).

Devices that operate in an unlicensed band (e.g., UEs, base stations, and/or the like) may contend for access to the unlicensed band prior to gaining access to and/or communicating over the unlicensed band, such as by performing a listen before talk (LBT) procedure. An LBT procedure may include performing a clear channel assessment (CCA) procedure to determine whether a channel of the unlicensed band is available. When a device determines that the channel of the unlicensed band is not available (e.g., because another apparatus is already using the channel), a CCA procedure may be performed for the channel again at a later time. The CCA procedure may include detecting an energy level on the channel of the unlicensed band and determining whether the energy level satisfies a threshold. When the energy level does not satisfy (e.g., is less than, or is less than or equal to) the threshold, the CCA procedure is successful and contention to access the channel of the unlicensed band may be successful. When the energy level satisfies (e.g., is greater than, or is greater than or equal to) the threshold, the CCA procedure is unsuccessful and contention to access the channel of the unlicensed band may be unsuccessful. When the CCA procedure is successful, the device may transmit over the channel of the unlicensed band.

Because channel access is not guaranteed in an unlicensed band, a greater number of candidate SSB positions may be used in an unlicensed band as compared to a licensed band. For example, a DRS transmission window in a licensed band may include 8 candidate SSB positions, as described above in connection with FIG. 4.

As shown by reference number 505, in an unlicensed band with an SCS of 30 kHz, there may be 20 candidate SSB positions in a 5 millisecond DRS transmission window, as compared to 8 candidate SSB positions in a licensed band with an SCS of 30 kHz. In the unlicensed band, SSBs may have 8 possible SSB index values (e.g., from 0 to 7, shown in parenthesis, and each of which may represent a different quasi co-location characteristics for a corresponding SSB), and those index values may be repeated one or more times in different SSB candidate positions in the DRS transmission window. As shown, candidate SSB positions 0 through 7 may carry SSBs having index values of 0 through 7, respectively; candidate SSB positions 8 through 15 may carry SSBs having index values of 0 through 7, respectively; and candidate SSB positions 16 through 19 may carry SSBs having index values of 0 through 3, respectively. In this way, a number of opportunities for SSB transmission in a DRS transmission window is increased for an unlicensed band to mitigate the lower reliability of the unlicensed band (due to shared channel characteristics, contention for access, and/or the like) as compared to a licensed band.

As shown by reference number 510, in an unlicensed band with an SCS of 15 kHz, there may be 10 candidate SSB positions in a 5 millisecond DRS transmission window, as compared to 8 candidate SSB positions in a licensed band with an SCS of 30 kHz. In the unlicensed band, SSBs may have 8 possible SSB index values (e.g., from 0 to 7, shown in parenthesis), and a portion of those index values may be repeated in different SSB candidate positions in the DRS transmission window. As shown, candidate SSB positions 0 through 7 may carry SSBs having index values of 0 through 7, respectively; and candidate SSB positions 8 and 9 may carry SSBs having index values of 0 and 1, respectively. In this way, a number of opportunities for SSB transmission in a DRS transmission window is increased for an unlicensed band to mitigate the lower reliability of the unlicensed band (due to shared channel characteristics, contention for access, and/or the like) as compared to a licensed band.

In example 500, the DRS transmission window has a duration of 5 milliseconds, which may be the maximum DRS transmission window duration. In some aspects, the DRS transmission window duration may have a duration of 0.5 milliseconds, 1 millisecond, 2 milliseconds, 3 milliseconds, 4 milliseconds, or 5 milliseconds, among other examples. In some aspects, a UE may assume a DRS transmission window duration of 5 milliseconds unless the UE receives an indication otherwise. In example 500, the maximum number of candidate SSB positions within a DRS transmission window is 10 for a 15 kHz SCS, and is 20 for a 30 kHz SCS.

Due to the differences in SSB design between a licensed operating mode and an unlicensed operating mode, a UE may need to determine whether a band in which the UE is operating is using the licensed operating mode or the unlicensed operating mode. Because SSBs are used for initial network access, this information cannot be easily signaled from a base station to a UE. In some cases, without determining whether the band is operating in the licensed operating mode or the unlicensed operating mode, the UE may search for SSBs in locations that do not include a candidate SSB position, such as when the band is operating in the licensed operating mode and the UE searches for SSBs according to the unlicensed operating mode. This wastes UE resources, such as processing resources, memory resources, battery power, and/or the like. In other cases, without determining whether the band is operating in the licensed operating mode or the unlicensed operating mode, the UE may refrain from searching for SSBs in locations that include a candidate SSB position, such as when the band is operating in the unlicensed operating mode and the UE searches for SSBs according to the licensed operating mode. This may cause the UE to miss opportunities to access the network, which may increase latency.

Furthermore, an SSB may carry different information depending on whether the SSB is transmitted in a band that is operating in a licensed operating mode or an unlicensed operating mode. For example, contents of a PBCH payload included in the SSB may differ in the licensed operating mode as compared to the unlicensed operating mode. Thus, without determining whether the band is operating in the licensed operating mode or the unlicensed operating mode, a UE may improperly interpret PBCH contents (or other SSB contents), which may lead to communication errors.

Some techniques and apparatuses described herein enable a UE to differentiate between SSBs transmitted in a licensed operating mode and SSBs transmitted in an unlicensed operating mode. This enables the UE to appropriately search for SSBs based at least in part on the operating mode, which conserves UE resources when the band is operating in the licensed operating mode, and which reduces latency and provides more opportunities for network access when the band is operating in the unlicensed operating mode. Furthermore, differentiating between the licensed operating mode and the unlicensed operating mode enables the UE to properly interpret PBCH content of an SSB, thereby reducing communication errors.

As indicated above, FIG. 5 is provided as an example. Other examples may differ from what is described with regard to FIG. 5.

Figure 6:
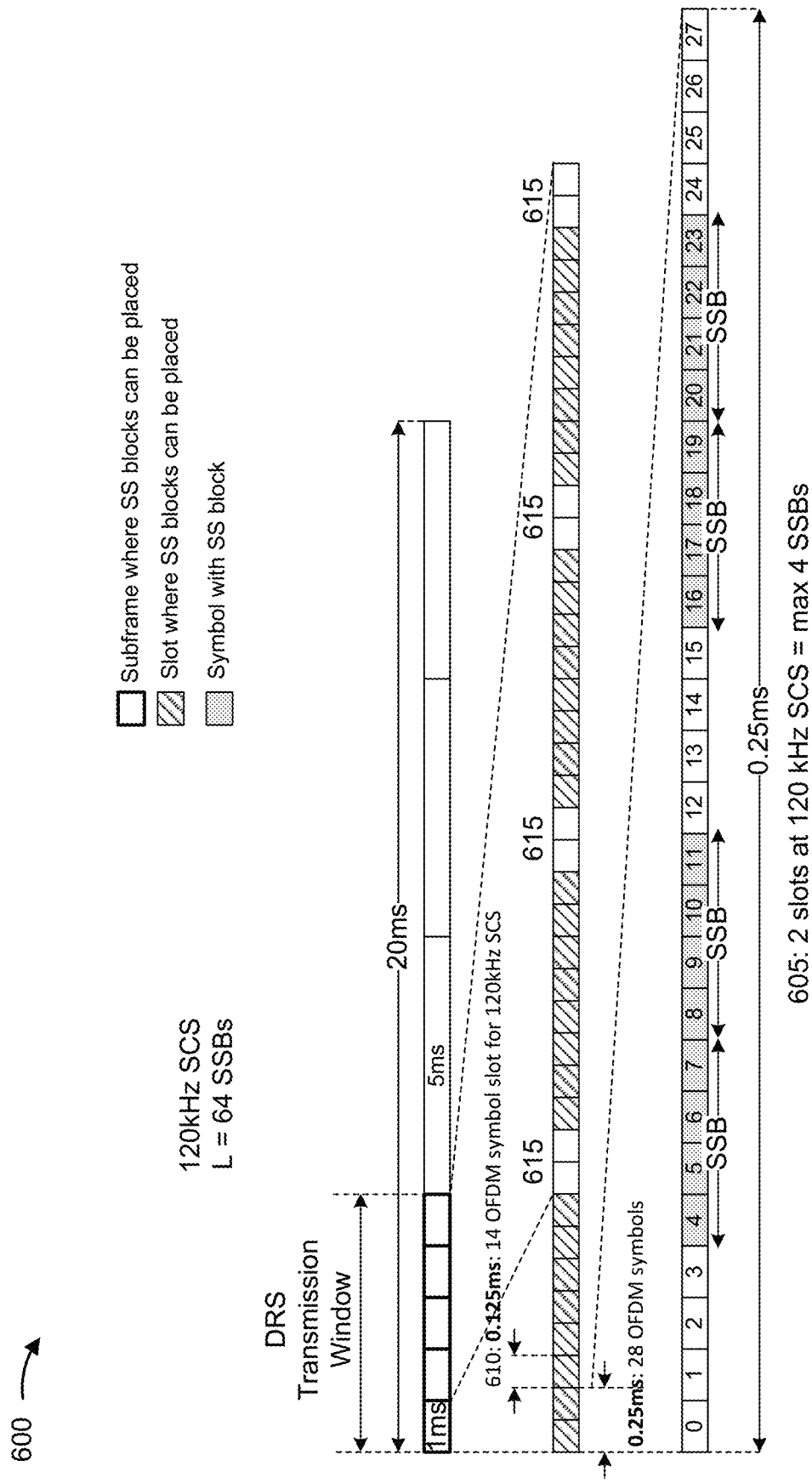
FIG. 6 is a diagram illustrating an example of SSB positions in a licensed radio frequency spectrum band with a 120 kHz sub-carrier spacing, in accordance with various aspects of the present disclosure.

FIG. 6 is a diagram illustrating an example 600 of SSB positions in a licensed radio frequency spectrum band with a 120 kHz sub-carrier spacing, in accordance with various aspects of the present disclosure.

As shown by reference number 605, in a configuration that includes 14 orthogonal frequency division multiplexing (OFDM) symbols per slot for an SCS of 120 kHz on a licensed band, a maximum of 4 SSBs may be transmitted across two consecutive slots. As shown by reference number 610, a slot may have a duration of 0.125 milliseconds for an SCS of 120 kHz. As shown by reference number 615, a DRS transmission window having a duration of 5 milliseconds in a band with an SCS of 120 kHz may be configured with a two slot gap (e.g., having a length of 0.25 milliseconds) after every 8 slots (e.g., 1 millisecond) that include SSBs, for a total of four gaps (covering 8 slots). Thus, the DRS transmission window may include a maximum of 64 SSBs.

The SSB positions shown in FIG. 6 are for a licensed operating mode, and different SSB positions may be used for an unlicensed operating mode. Some techniques and apparatuses described herein enable a UE to differentiate between SSBs transmitted in a licensed operating mode and SSBs transmitted in an unlicensed operating mode, which may conserve UE resources, may reduce latency, may provide more opportunities for network access, may reduce communication errors, and/or the like.

As indicated above, FIG. 6 is provided as an example. Other examples may differ from what is described with regard to FIG. 6.

Figure 7:
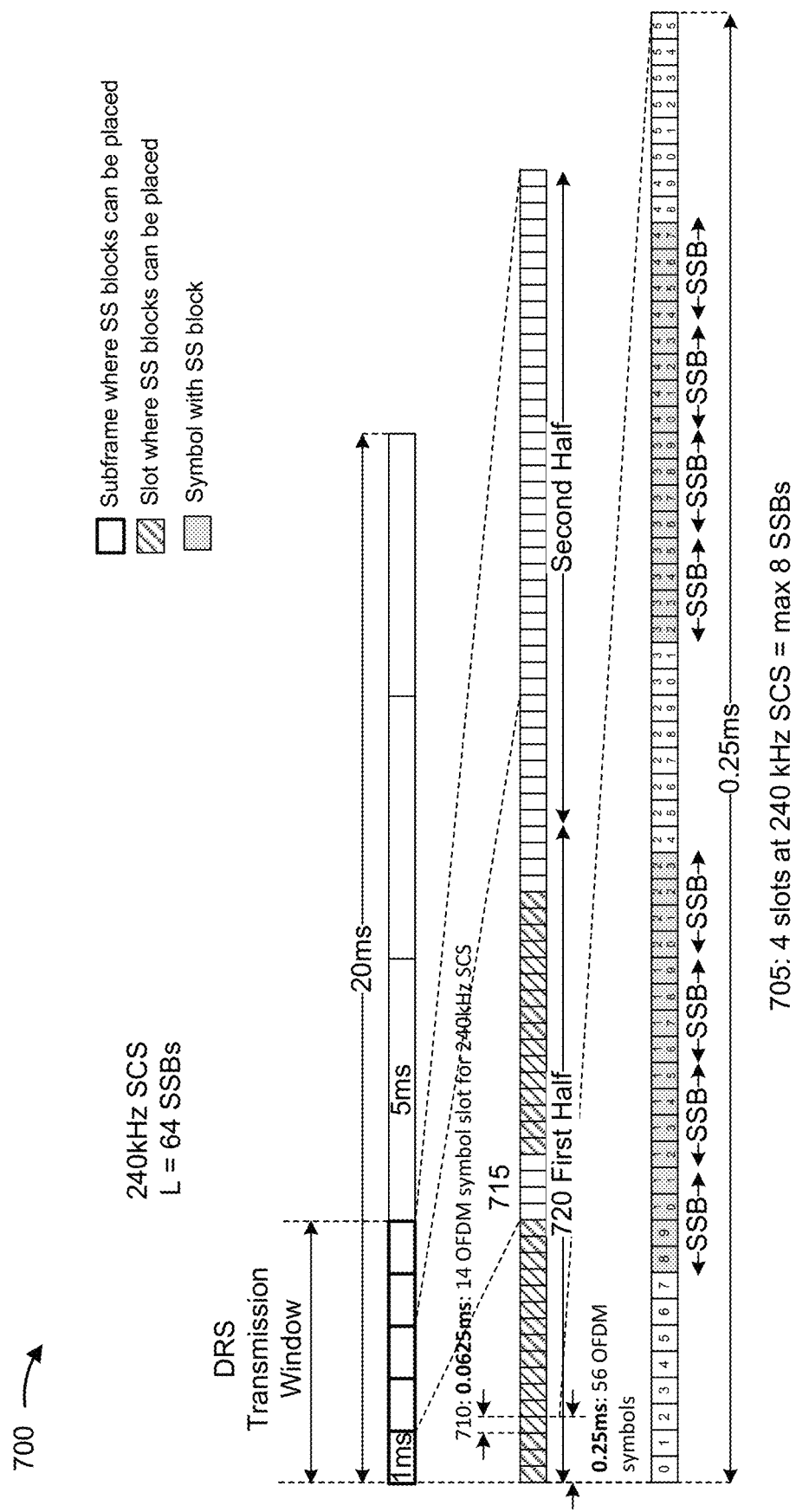
FIG. 7 is a diagram illustrating an example of SSB positions in a licensed radio frequency spectrum band with a 240 kHz sub-carrier spacing, in accordance with various aspects of the present disclosure.

FIG. 7 is a diagram illustrating an example 700 of SSB positions in a licensed radio frequency spectrum band with a 240 kHz sub-carrier spacing, in accordance with various aspects of the present disclosure.

As shown by reference number 705, in a configuration that includes 14 OFDM symbols per slot for an SCS of 240 kHz on a licensed band, a maximum of 8 SSBs may be transmitted across four consecutive slots. As shown by reference number 710, a slot may have a duration of 0.0625 milliseconds for an SCS of 240 kHz. As shown by reference number 715, a DRS transmission window having a duration of 5 milliseconds in a band with an SCS of 240 kHz may be configured with a four slot gap (e.g., having a length of 0.25 milliseconds) after the first 16 slots (e.g., 1 millisecond) that include SSBs. Furthermore, as shown by reference number 720, SSBs may only occupy the first half (e.g., the first 2.25 milliseconds) of the DRS transmission window for an SCS of 240 kHz. Thus, the DRS transmission window may include a maximum of 64 SSBs. With this configuration, SSB positions for a 240 kHz SCS may be time-aligned (at least in the first half of the DRS transmission window for 240 kHz) with SSB positions for a 120 kHz SCS.

The SSB positions shown in FIG. 7 are for a licensed operating mode, and different SSB positions may be used for an unlicensed operating mode. Some techniques and apparatuses described herein enable a UE to differentiate between SSBs transmitted in a licensed operating mode and SSBs transmitted in an unlicensed operating mode, which may conserve UE resources, may reduce latency, may provide more opportunities for network access, may reduce communication errors, and/or the like.

As indicated above, FIG. 7 is provided as an example. Other examples may differ from what is described with regard to FIG. 7.

Figure 8:
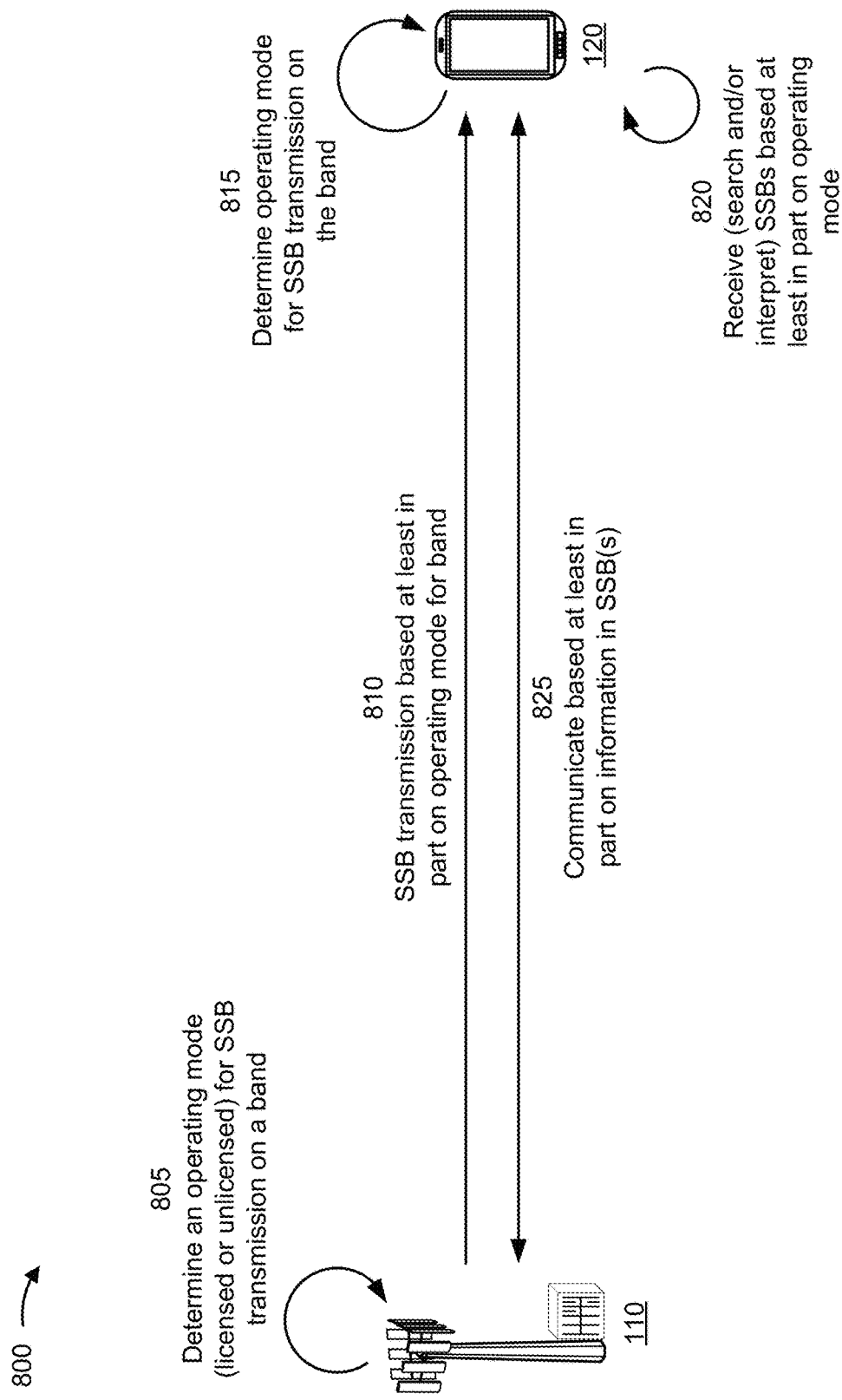
FIGS. 8-15 are diagrams illustrating examples of differentiating between synchronization signal block transmission in a licensed operating mode and an unlicensed operating mode, in accordance with various aspects of the present disclosure.

FIG. 8 is a diagram illustrating an example 800 of differentiating between SSB transmission in a licensed operating mode and an unlicensed operating mode, in accordance with various aspects of the present disclosure. As shown in FIG. 8, a base station 110 and a UE 120 may communicate with one another.

As shown by reference number 805, the base station 110 may determine an operating mode associated with SSB transmission in a band. In some aspects, the band is usable (e.g., configurable, deployable, operable, and/or the like) in a licensed operating mode or an unlicensed operating mode. The operating mode associated with SSB transmission may be one of the licensed operating mode (sometimes referred to herein as a licensed mode) or the unlicensed operating mode (sometimes referred to herein as an unlicensed mode). In some aspects, the band may be fixed as either a licensed band (e.g., that uses the licensing operating mode) or an unlicensed band (e.g., that uses the unlicensed operating mode). In this case, the base station 110 may store information, in a memory of the base station 110, that indicates whether the band is a licensed band or an unlicensed band, and the base station 110 may determine the operating mode using the stored information. In some aspects, the operating mode of the band may be configurable (e.g., in the licensed mode or the unlicensed mode) by the base station 110. In this case, the base station 110 may determine the operating mode based at least in part on a configuration used by the base station 110.

In some aspects, the band may be deployable as either a licensed band or an unlicensed band. For example, a band may operate as a licensed band in a first geographic region and as an unlicensed band in a second geographic region. As one example, an upper 6 GHz band may operate as an unlicensed band in the United States. and may operate as a licensed band in Europe. As another example, an upper 60 GHz band may operate as a licensed band in the United States, and may operate as an unlicensed band in Europe. In some aspects, the band may be an unlicensed band, but may be usable in a licensed mode (e.g., to allow licensed-assisted access (LAA) and/or the like).

As shown by reference number 810, the base station 110 may transmit one or more SSBs based at least in part on (e.g., according to) the determined operating mode. For example, if the band is operating using the licensed operating mode, then the base station 110 may transmit SSBs using a first quantity of candidate SSB positions. The first quantity may include (e.g., in a single DRS transmission window), for example, 8 SSB positions for an SCS of 15 kHz or 30 kHz, as described above in connection with FIG. 4; 64 SSB positions for an SCS of 120 kHz or 240 kHz, as described above in connection with FIGS. 6 and 7; and/or the like. The first quantity of candidate SSB positions may occupy a first set of time domain resources, as described above in connection with FIGS. 4, 6, and 7. If the band is operating using the unlicensed operating mode, then the base station 110 may transmit SSBs using a second quantity of candidate SSB positions. The second quantity may include (e.g., in a single DRS transmission window), for example, more than 8 SSB positions for an SCS of 15 kHz or 30 kHz, as described above in connection with FIG. 5; 10 candidate SSB positions for an SCS of 15 kHz; 20 candidate SSB positions for an SCS of 30 kHz; more than 64 SSB positions for an SCS of 120 kHz or 240 kHz; 128 candidate SSB positions; 160 candidate SSB positions; and/or the like. The second quantity of candidate SSB positions may occupy a second set of time domain resources that is different from (e.g., that includes a greater number of time domain resources) than the first set of time domain resources.

Additionally, or alternatively, the base station 110 may generate and/or include PBCH content (e.g., a PBCH payload), in an SSB, based at least in part on the operating mode. For example, the PBCH content of an SSB transmitted in the unlicensed operating mode may differ from the PBCH content of an SSB transmitted in the licensed operating mode. In some aspects, the PBCH payload may be used to indicate an SSB index value (e.g., alone or in combination with other information and/or indications).

The base station 110 may transmit an SSB in a candidate SSB position of a DRS transmission window. The base station 110 may indicate an SSB index value of an SSB. In some aspects, the base station 110 may determine the SSB index value based at least in part on whether the band is operating in the licensed mode or the unlicensed mode. In some aspects, the base station 110 may indicate the SSB index value based at least in part on a PBCH demodulation reference signal (DMRS) sequence index, an SCS of a band on which the SSB is transmitted, a PBCH payload, and/or the like. In some aspects, the base station 110 may transmit SSBs in all candidate SSB positions. In some aspects, the base station 110 may transmit SSBs in fewer than all candidate SSB positions, such as when fewer than all candidates SSB positions are configured or used by the base station 110 for actual SSB transmissions, when the base station 110 is unable to gain access to a channel of the unlicensed band for a portion of the DRS transmission window, and/or the like.

As shown by reference number 815, the UE 120 may determine an operating mode associated with SSB transmission on the band. As indicated above, the band may be usable (e.g., configurable, deployable, operable, and/or the like) in a licensed operating mode or an unlicensed operating mode. The UE 120 may determine the operating mode as one of the licensed operating mode or the unlicensed operating mode. Additional details regarding techniques that may be used by the UE 120 to determine the operating mode are described below in connection with FIGS. 9-14.

In some aspects, one or more of the techniques described below in connection with FIGS. 9-14 may be used when the band is deployed within (e.g., using) a primary cell and/or when the band is deployed within (e.g., using) a secondary cell. In some aspects, the same technique may be used to determine the operating mode for a band deployed within a primary cell and to determine the operating mode for a band deployed within a secondary cell. Alternatively, different techniques may be used to determine the operating mode for a band deployed within a primary cell as compared to determining the operating mode for a band deployed within a secondary cell. In some aspects, when the band is deployed within a secondary cell or is deployed within a secondary cell group, then the UE 120 may determine the operating mode based at least in part on an indication received on a primary cell. For example, the UE 120 may receive an indication, on the primary cell, that indicates an operating mode for a band deployed within a secondary cell or within a secondary cell group.

As shown by reference number 820, the UE 120 may receive one or more SSBs based at least in part on the determined operating mode. The SSB reception may include, for example, searching for one or more SSBs, interpreting contents of one or more SSBs (e.g., a PBCH payload), and/or the like. In some aspects, the UE 120 may search (e.g., monitor) for one or more SSBs based at least in part on the operating mode. For example, the UE 120 may search for a first quantity of SSBs (e.g., a smaller quantity) and/or may search for SSBs in a first set of time domain resources (e.g., a smaller set of time domain resources) based at least in part on determining that the SSB transmission is associated with the licensed operating mode. As another example, the UE 120 may search for a second quantity of SSBs (e.g., a greater quantity) and/or may search for SSBs in a second set of time domain resources (e.g., a larger set of time domain resources) based at least in part on determining that the SSB transmission is associated with the unlicensed operating mode. Additionally, or alternatively, the UE 120 may interpret an SSB (e.g., PBCH content) based at least in part on the operating mode.

As shown by reference number 825, the UE 120 and the base station 110 may communicate with one another based at least in part on information in the SSB(s). For example, the UE 120 and the base station 110 may communicate using a beam corresponding to an SSB with the best signal parameter (e.g., RSRP), as measured by the UE 120 and/or as indicated by the UE 120 to the base station 110. Additionally, or alternatively, the UE 120 and the base station 110 may communicate using a cell timing determined based at least in part on the SSB (e.g., an SSB index value). Additionally, or alternatively, the UE 120 and the base station 110 may communicate based at least in part on PBCH contents carried by the SSB.

By enabling the UE 120 to differentiate between SSBs transmitted in a licensed operating mode and SSBs transmitted in an unlicensed operating mode, some techniques and apparatuses described herein may conserve UE resources, may reduce latency, may provide more opportunities for network access, may reduce communication errors, and/or the like.

As indicated above, FIG. 8 is provided as an example. Other examples may differ from what is described with regard to FIG. 8.

Figure 9:
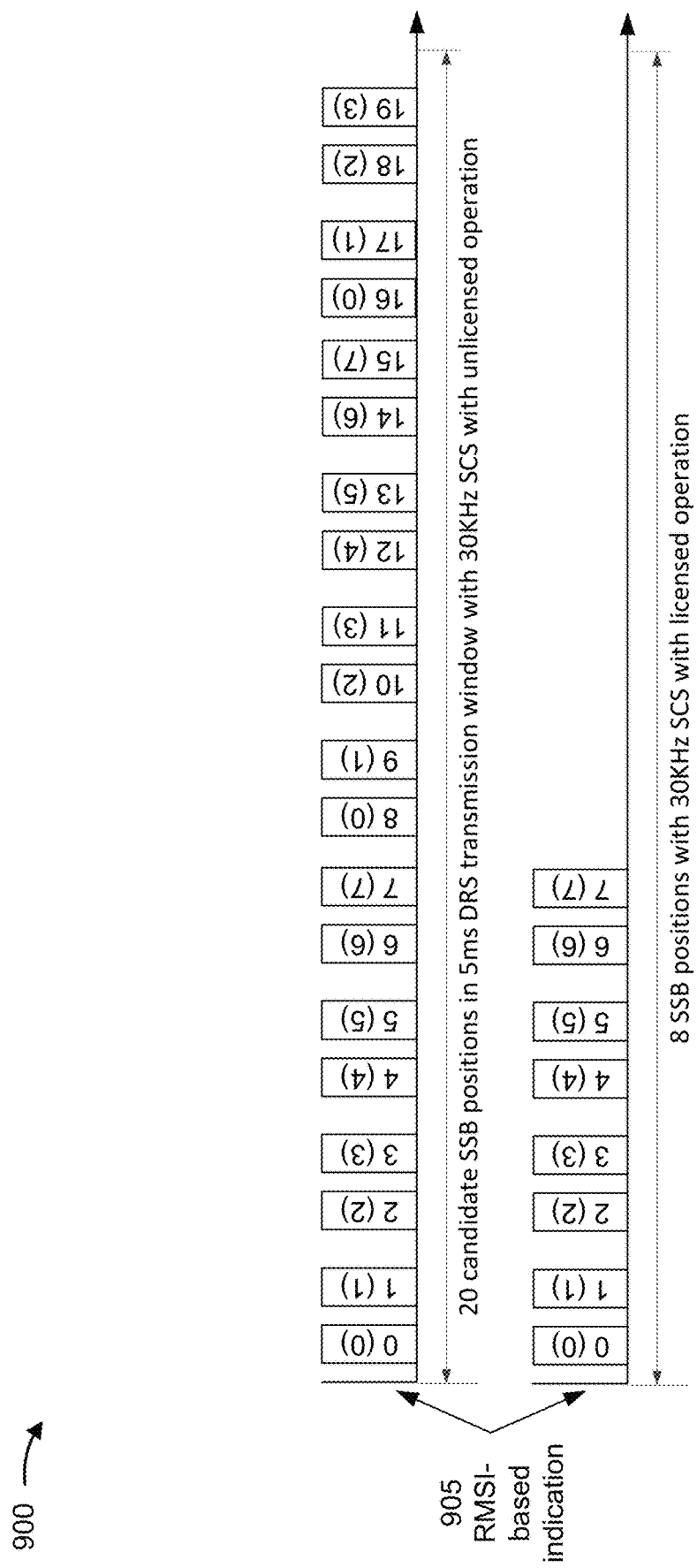

FIG. 9 is a diagram illustrating an example 900 of differentiating between SSB transmission in a licensed operating mode and an unlicensed operating mode, in accordance with various aspects of the present disclosure.

As shown by reference number 905, in some aspects, a UE 120 may determine an operating mode associated with SSB transmission based at least in part on an indication associated with remaining minimum system information (RMSI), shown as an RMSI-based indication. For example, a base station 110 may schedule the RMSI using a physical downlink control channel (PDCCH) communication, and/or may transmit (e.g., broadcast) the RMSI (e.g., according to scheduling information indicated by the PDCCH communication). The UE 120 may receive the PDCCH communication and/or the RMSI. The RMSI may be carried in system information, in a system information block (SIB), and/or the like. The PDCCH communication and/or the RMSI may indicate the operating mode for a band on which the SSBs are transmitted. As described elsewhere herein, the operating mode may include a licensed mode or an unlicensed mode.

In some aspects, the PDCCH communication that schedules the RMSI may indicate the operating mode. The PDCCH communication that schedules the RMSI may include downlink control information (DCI) having a specific format (e.g., DCI format 1_0), and that is scrambled using a specific radio network temporary identifier (RNTI), such as a system information RNTI (SI-RNTI). In some aspects, the PDCCH communication may include one or more bits (e.g., included in one or more DCI fields) that indicate that operating mode. For example, the PDCCH communication may include a single field (e.g., a licensed or unlicensed operating mode indicator field) that includes a single bit that indicates the operating mode. A first value of the bit may indicate the licensed mode, and a second value of the bit may indicate the unlicensed mode. The UE 120 may use the value of the bit to determine the operating mode.

Additionally, or alternatively, the operating mode may be indicated by a cyclic redundancy check (CRC) mask that is used for (e.g., applied to) the PDCCH communication. For example, the base station 110 may apply a first CRC mask to the PDCCH communication to indicate the licensed operating mode, and may apply a second CRC mask to the PDCCH communication to indicate the unlicensed operating mode. The UE 120 may test (e.g., using blind decoding, hypothesis testing, and/or the like) one or both of the CRC masks when receiving the PDCCH communication, and may determine an operating mode based at least in part on a result of performing the test. For example, if a CRC test passes using the first CRC mask, then the UE 120 may determine that the licensed operating mode is being used. Conversely, if a CRC test passes using the second CRC mask, then the UE 120 may determine that the unlicensed operating mode is being used Additionally, or alternatively, the operating mode may be indicated by a RNTI that is used for (e.g., applied to) the PDCCH communication. For example, the base station 110 may use a first RNTI to scramble the PDCCH communication to indicate the licensed operating mode, and may apply a second RNTI to scramble the PDCCH communication to indicate the unlicensed operating mode. In some aspects, at least one of the RNTIs is an SI-RNTI. The UE 120 may test (e.g., using blind decoding, hypothesis testing, and/or the like) one or both of the RNTIs when receiving the PDCCH communication, and may determine an operating mode based at least in part on a result of performing the test. For example, if RNTI descrambling is successful using the first RNTI, then the UE 120 may determine that the licensed operating mode is being used. Conversely, if RNTI descrambling is successful using the second RNTI, then the UE 120 may determine that the unlicensed operating mode is being used.

In some aspects, RMSI may indicate the operating mode. For example, the operating mode may be indicated in a payload of the RMSI, such as an RMSI physical downlink shared channel (PDSCH) payload. In some aspects, the RMSI payload may include a bit that indicates the operating mode. A first value of the bit may indicate the licensed mode, and a second value of the bit may indicate the unlicensed mode. The UE 120 may use the value of the bit to determine the operating mode.

Using the PDCCH communication to indicate the operating mode may enable the UE 120 to determine the correct operating mode earlier in time as compared to using the RMSI payload to indicate the operating mode, which may reduce latency, but which may increase complexity of PDCCH decoding. Using the RMSI payload to indicate the operating mode may enable the UE 120 to determine the correct operating mode with reduced complexity, but with higher latency as compared to using the PDCCH communication.

In some aspects, the UE 120 may perform blind decoding by receiving SSB(s) using both the licensed operating mode and the unlicensed operating mode (e.g., by performing blind decoding, by testing multiple hypotheses, and/or the like) until the UE 120 successfully identifies the operating mode from the PDCCH communication and/or the RMSI. After determining the operating mode, the UE 120 may then receive SSB(s) using the determined operating mode (e.g., without performing the blind decoding or testing the multiple hypotheses).

As indicated above. FIG. 9 is provided as an example. Other examples may differ from what is described with regard to FIG. 9.

Figure 10:
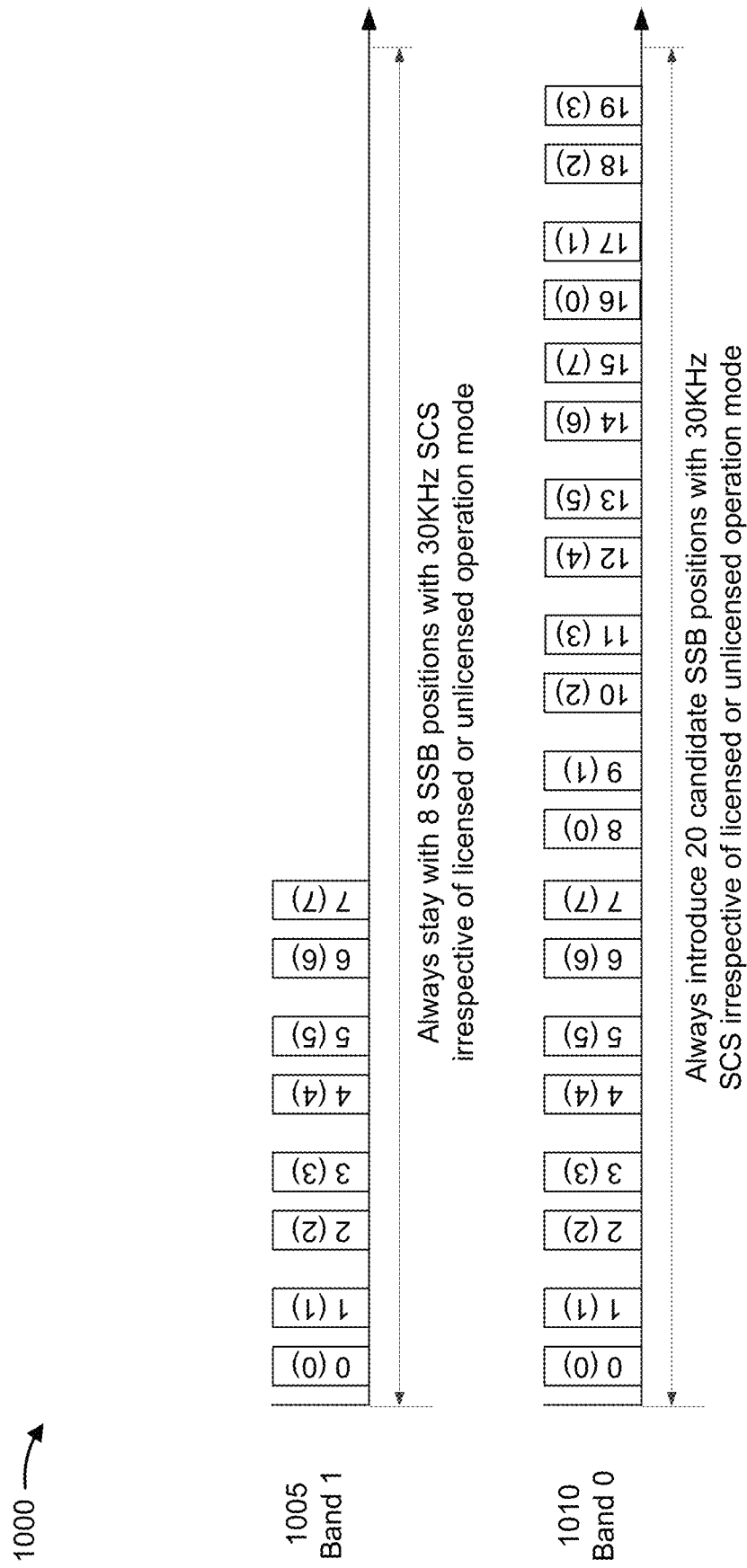

FIG. 10 is a diagram illustrating an example 1000 of differentiating between SSB transmission in a licensed operating mode and an unlicensed operating mode, in accordance with various aspects of the present disclosure.

As shown in FIG. 10, in some aspects, a UE 120 may determine an operating mode associated with SSB transmission based at least in part on a band on which the UE 120 searches for SSBs. For example, a band may always be associated with a particular operating mode (e.g., licensed or unlicensed), and that particular operating mode may always be used for the band.

For example, as shown by reference number 1005, the UE 120 (and/or the base station 110) may always use a licensed operating mode on a first band (e.g., of a first set of bands). In this case, when the UE 120 obtains SSBs on the first band, the UE 120 may always search for a first quantity of SSBs and/or may always search for SSBs in a first set of time domain resources, as described above. Additionally. or alternatively, when a UE 120 obtains SSBs on the first band, the UE 120 may always interpret SSB contents (e.g., PBCH contents) according to the licensed mode. Similarly, the base station 110 may transmit the first quantity of SSBs, may transmit SSBs in a first set of time domain resources, and/or may include SSB contents according to the licensed mode.

In some aspects, the UE 120 may always use the licensed operating mode for the first band regardless of whether the base station 110 is actually operating the first band using the licensed operating mode or the unlicensed operating mode.

Additionally, or alternatively, the UE 120 may always use the licensed operating mode for the first band even if the first band is operable (e.g., deployable, configurable, and/or the like) using both the licensed operating mode and the unlicensed operating mode (e.g., at different times). This may reduce complexity for the UE 120.

As another example, as shown by reference number 1010, the UE 120 (and/or the base station 110) may always use an unlicensed operating mode on a second band (e.g., of a second set of bands). In this case, when the UE 120 obtains SSBs on the second band, the UE 120 may always search for a second quantity of SSBs and/or may always search for SSBs in a second set of time domain resources, as described above. Additionally, or alternatively, when a UE 120 obtains SSBs on the second band, the UE 120 may always interpret SSB contents (e.g., PBCH contents) according to the unlicensed mode. Similarly, the base station 110 may transmit the second quantity of SSBs, may transmit SSBs in a second set of time domain resources, and/or may include SSB contents according to the unlicensed mode.

In some aspects, the UE 120 may always use the unlicensed operating mode for the second band regardless of whether the base station 110 is actually operating the second band using the licensed operating mode or the unlicensed operating mode. Additionally, or alternatively, the UE 120 may always use the unlicensed operating mode for the second band even if the second band is operable (e.g., deployable, configurable, and/or the like) using both the licensed operating mode and the unlicensed operating mode (e.g., at different times). This may reduce complexity for the UE 120.

In some aspects, the UE 120 may initially use one of the licensed operating mode or the unlicensed operating mode to receive SSBs on the band until an indication of the operating mode is received (e.g., in association with RMSI). After receiving the indication, the UE 120 may operate on the band according to the indicated operating mode, as described above in connection with FIG. 9.

As indicated above. FIG. 10 is provided as an example. Other examples may differ from what is described with regard to FIG. 10.

Figure 11:
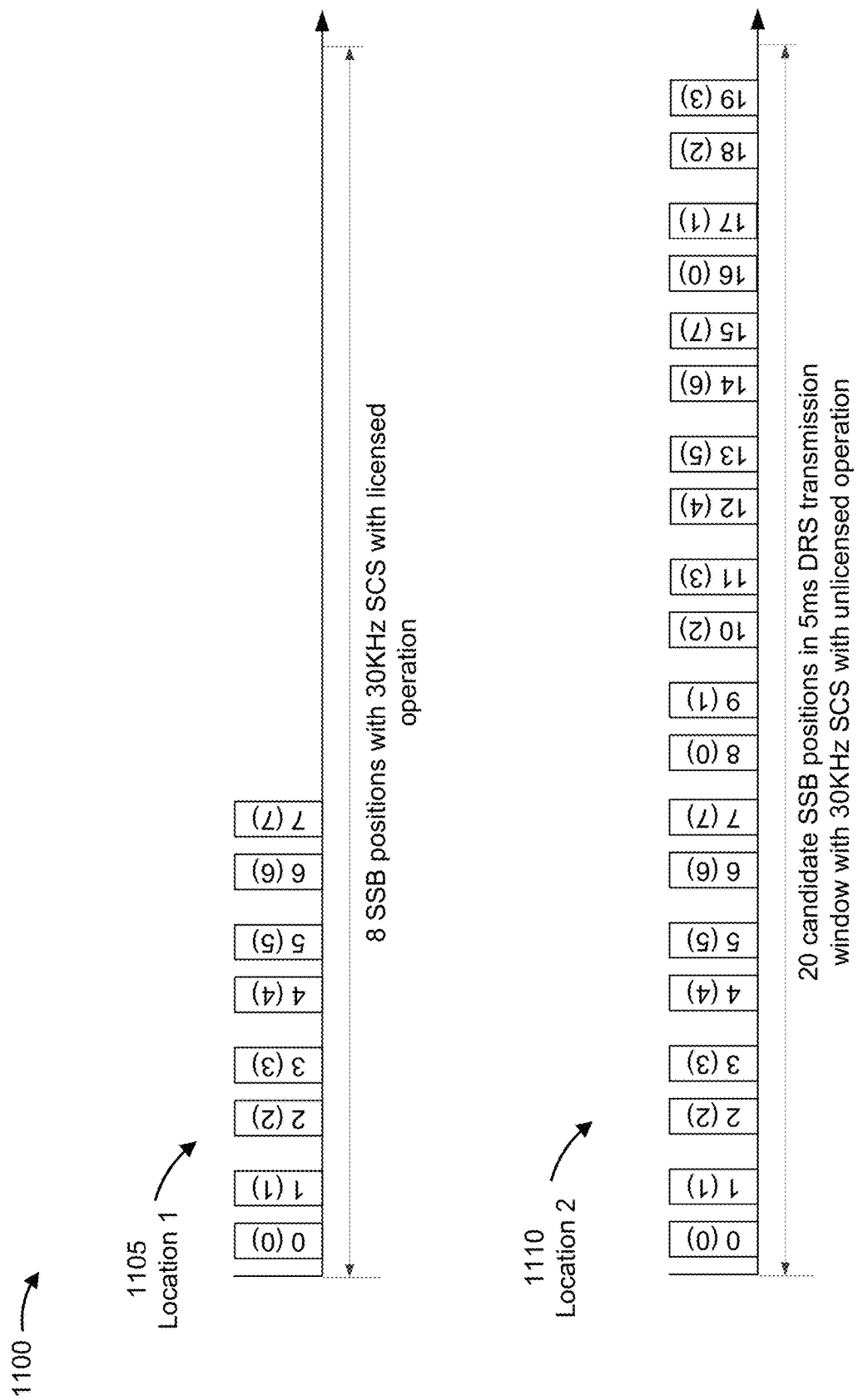

FIG. 11 is a diagram illustrating an example 1100 of differentiating between SSB transmission in a licensed operating mode and an unlicensed operating mode, in accordance with various aspects of the present disclosure.

As shown in FIG. 11, in some aspects, a UE 120 may determine an operating mode associated with SSB transmission based at least in part on a geographic location of the UE 120 (e.g., a geographic location in which the UE 120 is located). For example, a band may be associated with a particular operating mode (e.g., licensed or unlicensed) when the band is used in a particular geographic region. In this case, the UE 120 may determine a geographic location of the UE 120, may determine a band on which the UE 120 is searching for SSBs, and may determine an operating mode for the band based at least in part on the geographic location (and/or based at least in part on the band). The UE 120 may determine the geographic location based at least in part on a global navigation satellite system (GNSS) location (e.g., a global positioning system (GPS) location, among other examples), triangulation information, and/or the like.

For example, as shown by reference number 1105, in a first geographic region (e.g., that includes multiple geographic locations), a band may operate using the licensed operating mode. As another example, and as shown by reference number 1110, in a second geographic region, the band may operate using the unlicensed operating mode.

As indicated above, FIG. 11 is provided as an example. Other examples may differ from what is described with regard to FIG. 11.

Figure 12:
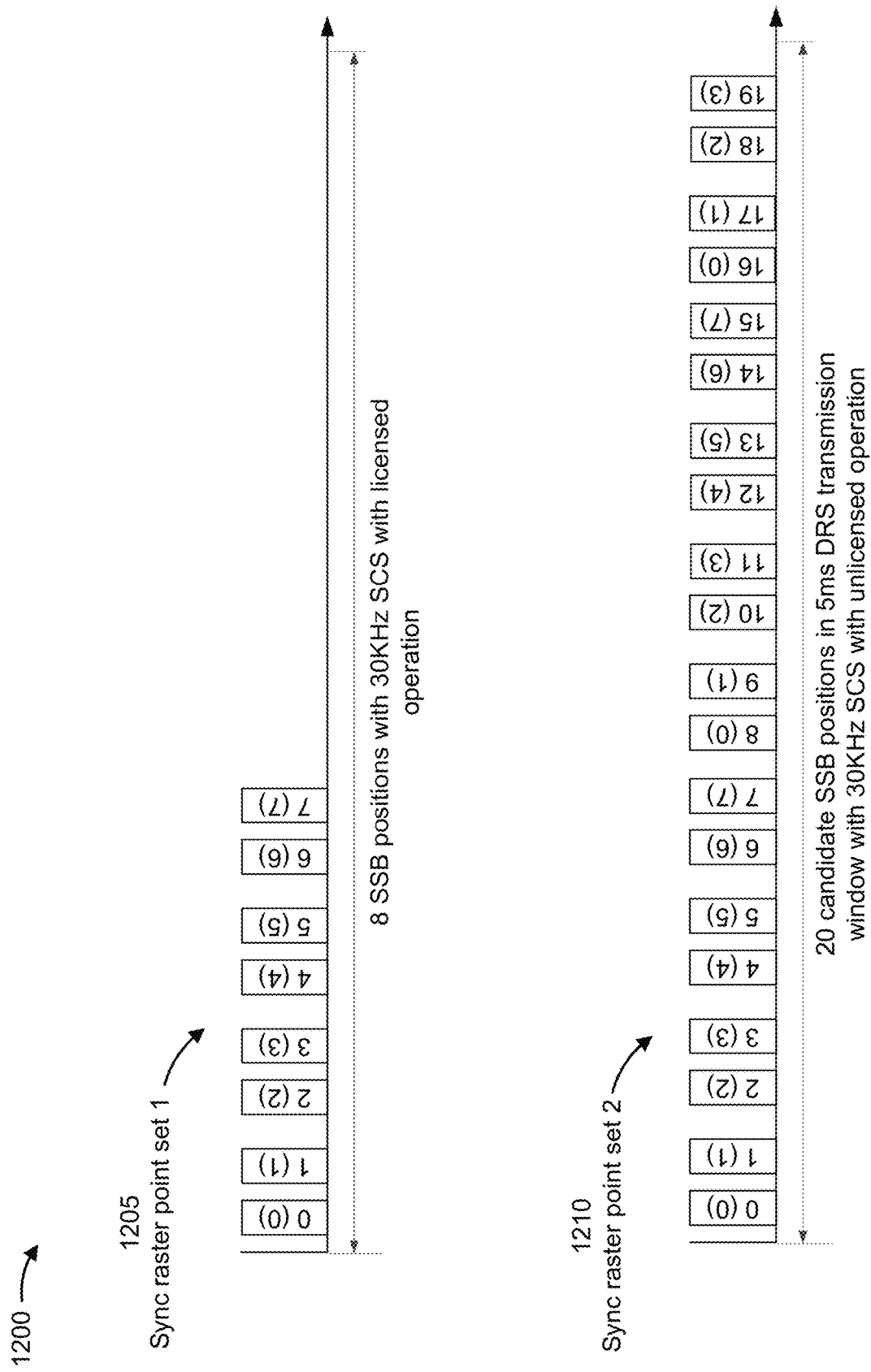

FIG. 12 is a diagram illustrating an example 1200 of differentiating between SSB transmission in a licensed operating mode and an unlicensed operating mode, in accordance with various aspects of the present disclosure.

As shown in FIG. 12, in some aspects, a UE 120 may determine an operating mode associated with SSB transmission based at least in part on a synchronization raster on which the SSB transmission occurs. "Synchronization raster" may refer to a frequency domain location (e.g., a frequency or a range of frequencies) on which communication occurs. For example, a first set of (e.g., one or more) synchronization rasters may be used for the licensed operating mode, and a second set of (e.g., one or more) synchronization rasters may be used for the unlicensed operating mode. In some aspects, the first set of synchronization rasters and the second set of synchronization rasters may not overlap with one another.

In some aspects, a synchronization raster may be a subset of a band. In some aspects, a band may include multiple synchronization rasters. In this case, a first synchronization raster of the band may be used for the licensed mode, and a second synchronization raster of the band may be used for the unlicensed mode. The UE 120 may determine (e.g., identify) a synchronization raster on which the UE 120 is to search for SSBs, and may determine an operating mode for the band based at least in part on the synchronization raster (and/or based at least in part on the band).

For example, as shown by reference number 1205, on a first synchronization raster, a band may operate using the licensed operating mode. As another example, and as shown by reference number 1210, on a second synchronization raster, the band may operate using the unlicensed operating mode.

As indicated above, FIG. 12 is provided as an example. Other examples may differ from what is described with regard to FIG. 12.

Figure 13:
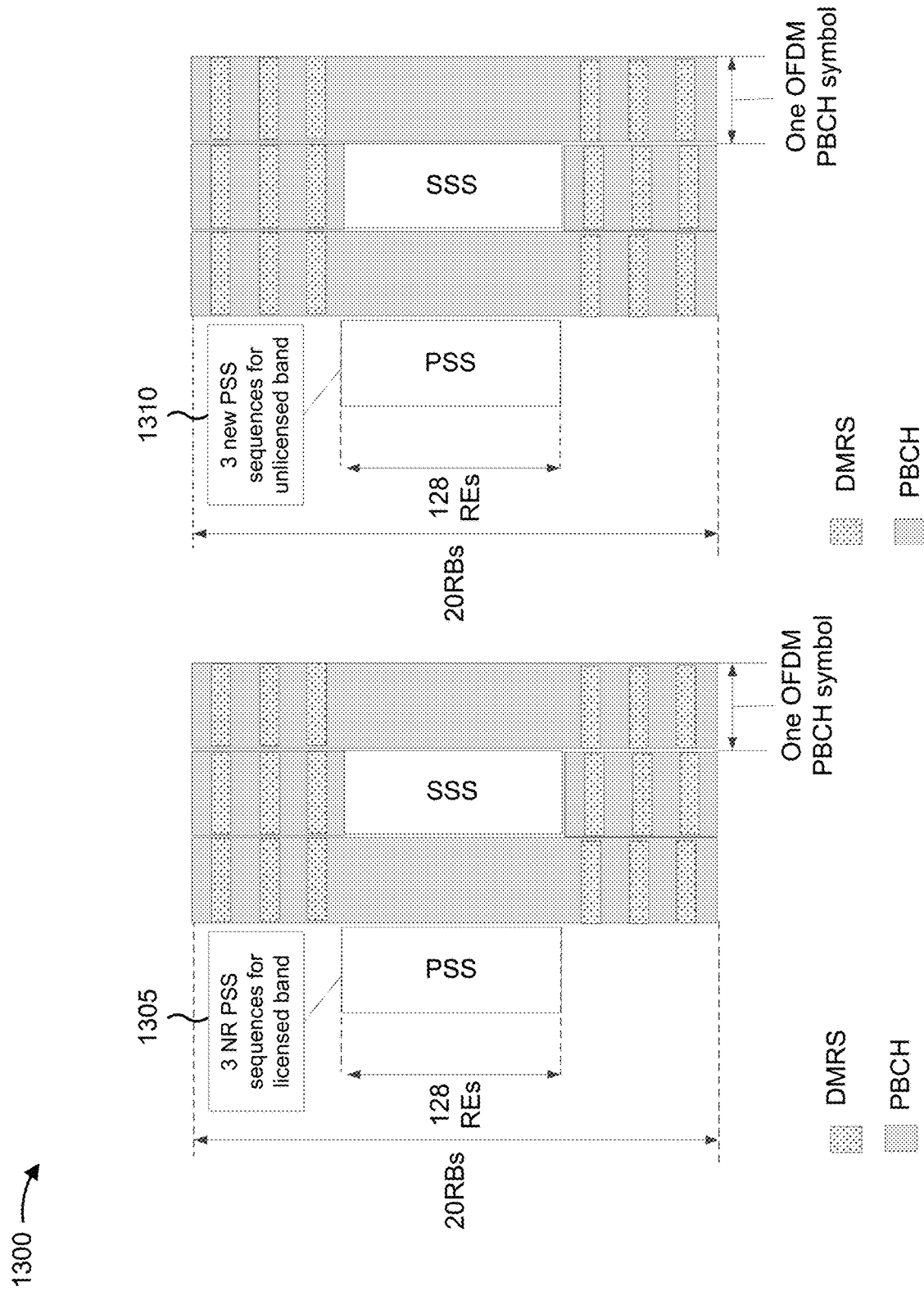

FIG. 13 is a diagram illustrating an example 1300 of differentiating between SSB transmission in a licensed operating mode and an unlicensed operating mode, in accordance with various aspects of the present disclosure.

In some aspects, a UE 120 may determine an operating mode associated with SSB transmission based at least in part on an SSB design. Examples of using different SSB designs to indicate different operating modes (e.g., licensed or unlicensed) are described in connection with FIGS. 13-15. When different SSB designs are used to indicate different operating modes, a UE 120 may perform blind decoding of one or more SSBs to test multiple SSB design hypotheses. The UE 120 may use a result of the blind decoding (e.g., successful decoding or unsuccessful decoding) to determine an SSB design, and may use the determined SSB design to identify the operating mode.

As shown in FIG. 13, in some aspects, the UE 120 may determine an operating mode associated with SSB transmission based at least in part on a sequence used for a PSS included in an SSB. As shown, and as described above in connection with FIG. 3, an SSB may include a PSS, an SSS, and a PBCH communication. As shown by reference number 1305, a first set of PSS sequences (e.g., a first set of three sequences, which may be reused from existing NR sequences) may be used to indicate the licensed operating mode. As shown by reference number 1310, a second set of PSS sequences (e.g., a second set of three sequences, which may be new sequences) may be used to indicate the unlicensed operating mode. In this case, the base station 110 may select a sequence from the first set, for the PSS, to indicate the licensed operating mode, and may select a sequence from the second set, for the PSS, to indicate the licensed operating mode. The UE 120 may perform blind decoding to test multiple PSS sequences, may determine whether a PSS sequence used for successful decoding is included in the first set or the second set, and may identify the operating mode accordingly.

Although FIG. 13 shows an example of using a PSS sequence to indicate the operating mode, the same technique or a similar technique may be used to indicate the operating mode using an SSS sequence.

As indicated above, FIG. 13 is provided as an example. Other examples may differ from what is described with regard to FIG. 13.

Figure 14:
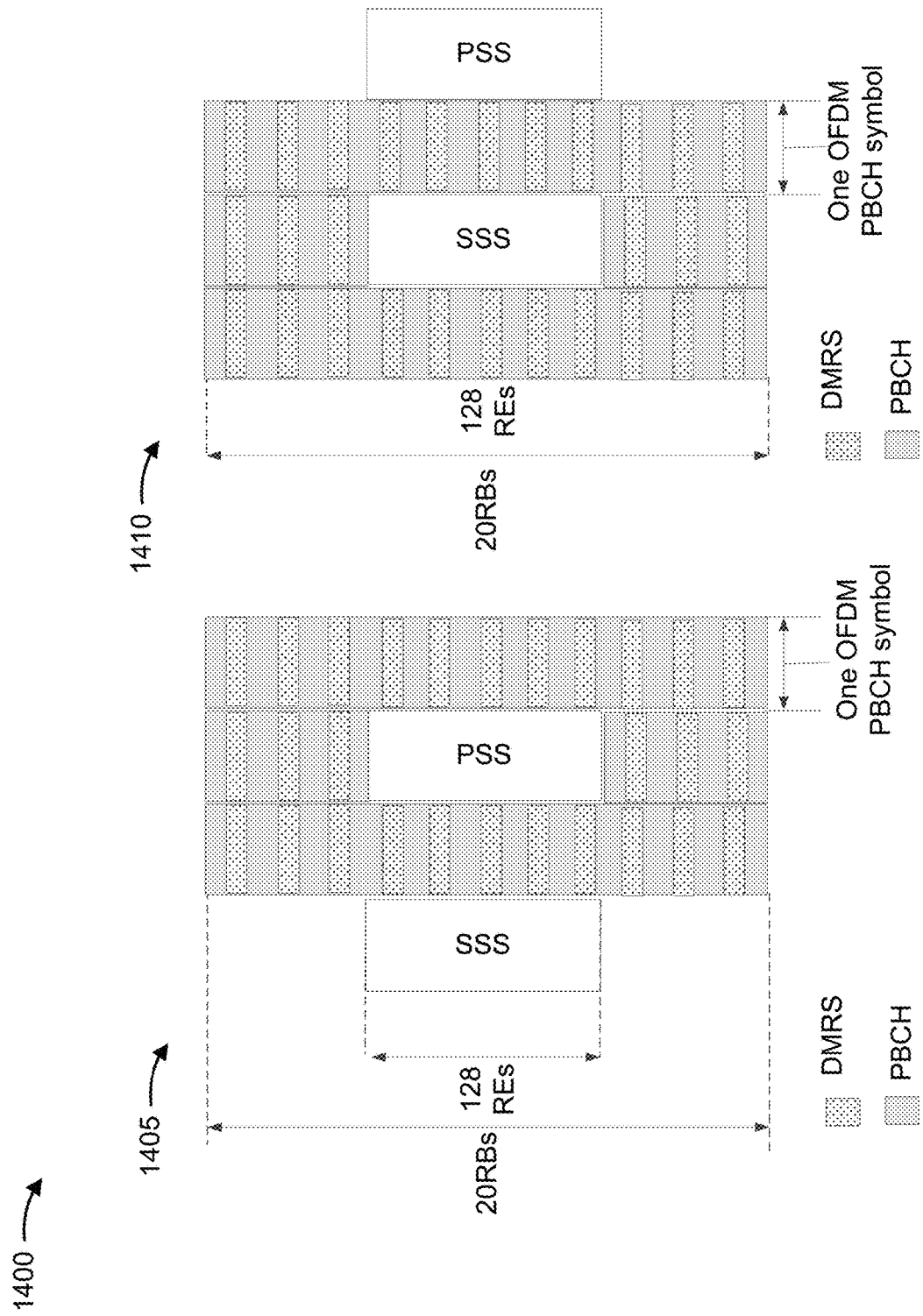

FIG. 14 is a diagram illustrating an example 1400 of differentiating between SSB transmission in a licensed operating mode and an unlicensed operating mode, in accordance with various aspects of the present disclosure.

In some aspects, a UE 120 may determine an operating mode associated with SSB transmission based at least in part on an SSB design. Examples of using different SSB designs to indicate different operating modes (e.g., licensed or unlicensed) are described in connection with FIGS. 13-15. When different SSB designs are used to indicate different operating modes, a UE 120 may perform blind decoding of one or more SSBs to test multiple SSB design hypotheses. The UE 120 may use a result of the blind decoding (e.g., successful decoding or unsuccessful decoding) to determine an SSB design, and may use the determined SSB design to identify the operating mode.

As shown in FIG. 14, in some aspects, the UE 120 may determine an operating mode associated with SSB transmission based at least in part on a symbol placement, within an SSB, of a PSS included in the SSB, an SSS included in the SSB, and/or a PBCH communication included in the SSB. For example, a first symbol placement may be used to indicate the licensed operating mode, and a second symbol placement may be used to indicate the unlicensed operating mode.

As described above in connection with FIG. 3, an SSB may include a PSS, an SSS, and a PBCH communication. As also described above in connection with FIG. 3, the PSS may be placed in the first symbol of the SSB, the SSS may be placed in the third symbol of the SSB (e.g., a portion of the third symbol), and the PBCH communication may be placed in the second and fourth (and a portion of the third) symbols of the SSB. In some aspects, this symbol placement for the PSS, the SSS, and the PBCH communication may be used to indicate a first operating mode (e.g., one of the licensed mode or the unlicensed mode). The first symbol may be symbol 0, the second symbol may be symbol 1, the third symbol may be symbol 2, and the fourth symbol may be symbol 3.

As an example, and as shown by reference number 1405, the SSS may be placed in the first symbol of the SSB, the PSS may be placed in the third symbol of the SSB (e.g., a portion of the third symbol), and the PBCH communication may be placed in the second and fourth (and a portion of the third) symbols of the SSB. In some aspects, this symbol placement may indicate a second operating mode (e.g., one of the licensed mode or the unlicensed mode).

As an example, and as shown by reference number 1410, the SSS may be placed in the second symbol of the SSB (e.g., a portion of the second symbol), the PSS may be placed in the fourth symbol of the SSB, and the PBCH communication may be placed in the first and third (and a portion of the second) symbols of the SSB. In some aspects, this symbol placement may indicate a second operating mode (e.g., one of the licensed mode or the unlicensed mode).

Although FIG. 14 shows example symbol placements, other symbol placements may be used. In general, a first symbol placement may be used to indicate a first operating mode (e.g., the licensed operating mode), and a second symbol placement may be used to indicate a second operating mode (e.g., the unlicensed operating mode).

As indicated above, FIG. 14 is provided as an example. Other examples may differ from what is described with regard to FIG. 14.

Figure 15:
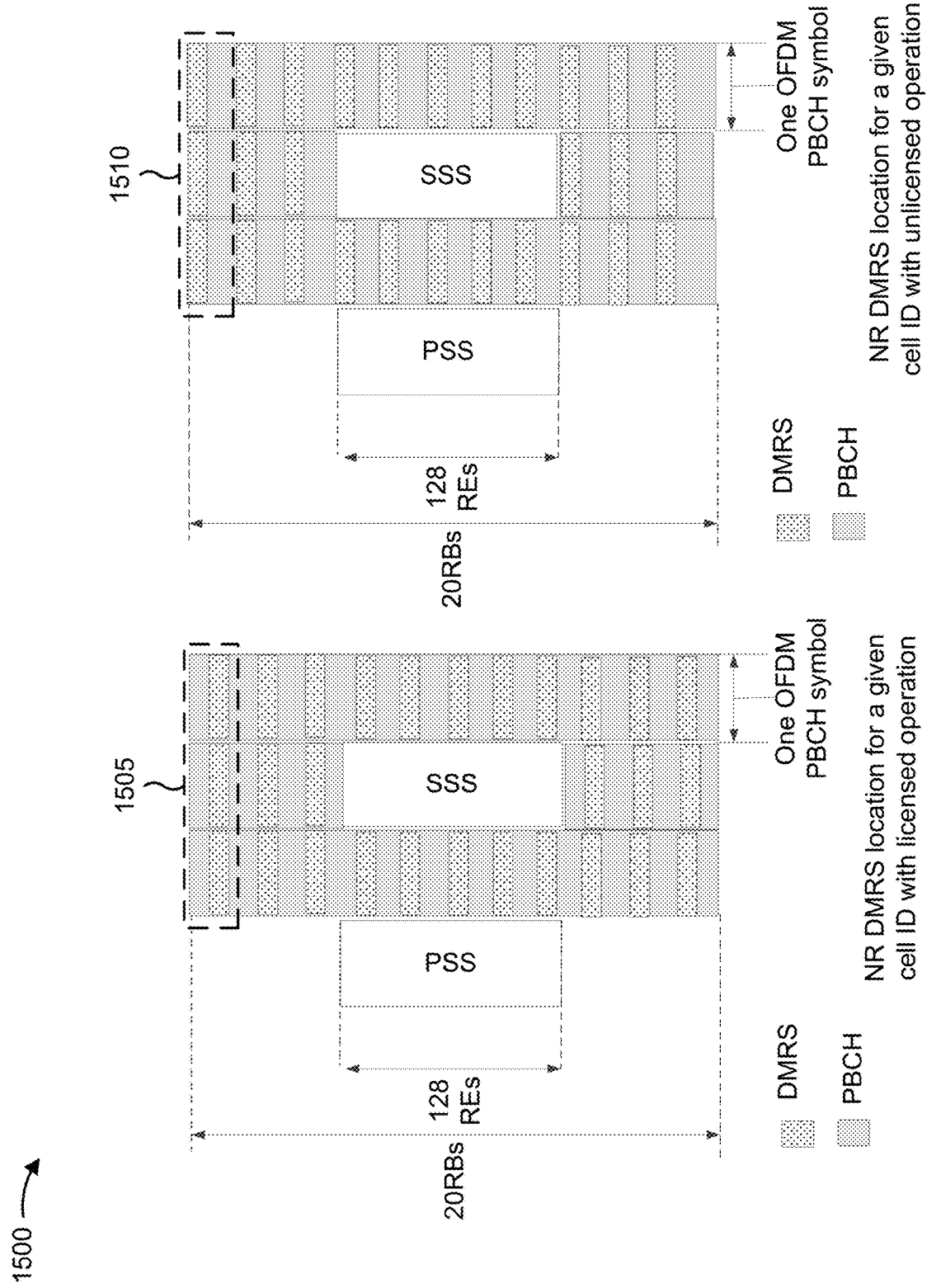

FIG. 15 is a diagram illustrating an example 1500 of differentiating between SSB transmission in a licensed operating mode and an unlicensed operating mode, in accordance with various aspects of the present disclosure.

In some aspects, a UE 120 may determine an operating mode associated with SSB transmission based at least in part on an SSB design. Examples of using different SSB designs to indicate different operating modes (e.g., licensed or unlicensed) are described in connection with FIGS. 13-15. When different SSB designs are used to indicate different operating modes, a UE 120 may perform blind decoding of one or more SSBs to test multiple SSB design hypotheses. The UE 120 may use a result of the blind decoding (e.g., successful decoding or unsuccessful decoding) to determine an SSB design, and may use the determined SSB design to identify the operating mode.

In some aspects, the UE 120 may determine an operating mode associated with SSB transmission based at least in part on an indication received in association with a PBCH communication included in an SSB. In some aspects, the PBCH communication may indicate the operating mode. For example, the operating mode may be indicated in a payload of the PBCH communication. In some aspects, the PBCH communication may include a bit that indicates the operating mode. A first value of the bit may indicate the licensed mode, and a second value of the bit may indicate the unlicensed mode. The UE 120 may use the value of the bit to determine the operating mode.

Additionally, or alternatively, the operating mode may be indicated by a CRC mask that is used for (e.g., applied to) the PBCH communication. For example, the base station 110 may apply a first CRC mask to the PBCH communication to indicate the licensed operating mode, and may apply a second CRC mask to the PBCH communication to indicate the unlicensed operating mode. The UE 120 may test (e.g., using blind decoding, hypothesis testing, and/or the like) one or both of the CRC masks when receiving the PBCH communication, and may determine an operating mode based at least in part on a result of performing the test. For example, if a CRC test passes using the first CRC mask, then the UE 120 may determine that the licensed operating mode is being used. Conversely, if a CRC test passes using the second CRC mask, then the UE 120 may determine that the unlicensed operating mode is being used.

Additionally, or alternatively, the operating mode may be indicated by a scrambling parameter that is used for (e.g., applied to) the PBCH communication and/or for a demodulation reference signal (DMRS) of the PBCH communication. For example, the base station 110 may use a first scrambling parameter to scramble and/or to generate a scrambling sequence for the PBCH communication and/or the DMRS to indicate the licensed operating mode, and may use a second scrambling parameter to scramble and/or to generate a scrambling sequence for the PBCH communication and/or the DMRS to indicate the unlicensed operating mode. The UE 120 may test (e.g., using blind decoding, hypothesis testing, and/or the like) one or both of the scrambling parameters when receiving the PBCH communication, and may determine an operating mode based at least in part on a result of performing the test. For example, if PBCH and/or DMRS descrambling is successful using the first scrambling parameter, then the UE 120 may determine that the licensed operating mode is being used. Conversely, if PBCH and/or DMRS descrambling is successful using the second scrambling parameter, then the UE 120 may determine that the unlicensed operating mode is being used.

As an example, to indicate a first operating mode (e.g., the licensed operating mode), PBCH DMRS scrambling may be initialized according to:

$$c_{init} = 2^{11} \cdot (\hat{I}_{SSB}+1) \cdot (\lfloor N_{ID}^{cell}/4 \rfloor+1) + 2^6 \cdot (\hat{I}_{SSB}+1) + \text{mod}(N_{ID}^{cell}, 4)$$

In the above equation, $\hat{I}_{SSB} = I_{SSB} + 4HF$ for max L=4, and $\hat{I}_{SSB} = \text{mod}(I_{SSB}, 8)$ for max L=8 or 64. In the above equation, $I_{SSB}$ is the SSB index within the SSB burst set. In the above equation, HF=0 in the first half frame of a radio frame and HF=1 in the second half frame of a radio frame.

As an example, to indicate a second operating mode (e.g., the unlicensed operating mode), PBCH DMRS scrambling may be initialized according to $$c_{init} = 2^{11} \cdot \left(\hat{I}_{SSB}+1\right) \cdot \left(\left\lfloor \frac{N_{ID}^{cell}}{4} \right\rfloor + 1\right) + 2^6 \cdot \left(\hat{I}_{SSB}+1\right) + \text{mod}(N_{ID}^{cell}, 4) + 1 \text{ or } 2 \text{ or } 3$$

In this example, a constant value (e.g., 1 or 2 or 3, among other examples) is added to the PBCH DMRS scrambling initialization value ($c_{init}$) used for the first operating mode to generate a PBCH DMRS scrambling initialization value for the second operating mode.

Additionally, or alternatively, the operating mode may be indicated by a location of the DMRS of the PBCH communication. As shown by reference number 1505, a first PBCH DMRS pattern (e.g., a first frequency domain pattern, a first resource block (RB) pattern, and/or the like) may indicate a first operating mode. Similarly, as shown by reference number 1510, a second PBCH DMRS pattern (e.g., a second frequency domain pattern, a second RB pattern, and/or the like) may indicate a second operating mode.

As an example, to indicate a first operating mode (e.g., the licensed operating mode), a first cell identifier-based frequency shift may be applied to PBCH DMRS resource element (RE) locations as follows:

$$v_{shift} = N_{ID}^{cell} \bmod 4$$

As an example, to indicate a second operating mode (e.g., the unlicensed operating mode), a second cell identifier-based frequency shift may be applied to PBCH DMRS RE locations as follows:

$$v_{shift} = N_{ID}^{cell} \bmod 4 + 1 \text{ or } 2 \text{ or } 3$$

In this example, a constant value (e.g., 1 or 2 or 3, among other examples) is added to the cell identifier-based frequency shift ($v_{shift}$) used for the first operating mode to generate a cell identifier-based frequency shift for the second operating mode.

As indicated above, FIG. 15 is provided as an example. Other examples may differ from what is described with regard to FIG. 15.

Fig. is a diagram illustrating an example process 1600 performed, for example, by a UE, in accordance with various aspects of the present disclosure. Example process 1600 is an example where the UE (e.g., UE 120 and/or the like) performs operations associated with differentiating between SSB transmission in a licensed operating mode and an unlicensed operating mode.

Figure 16:
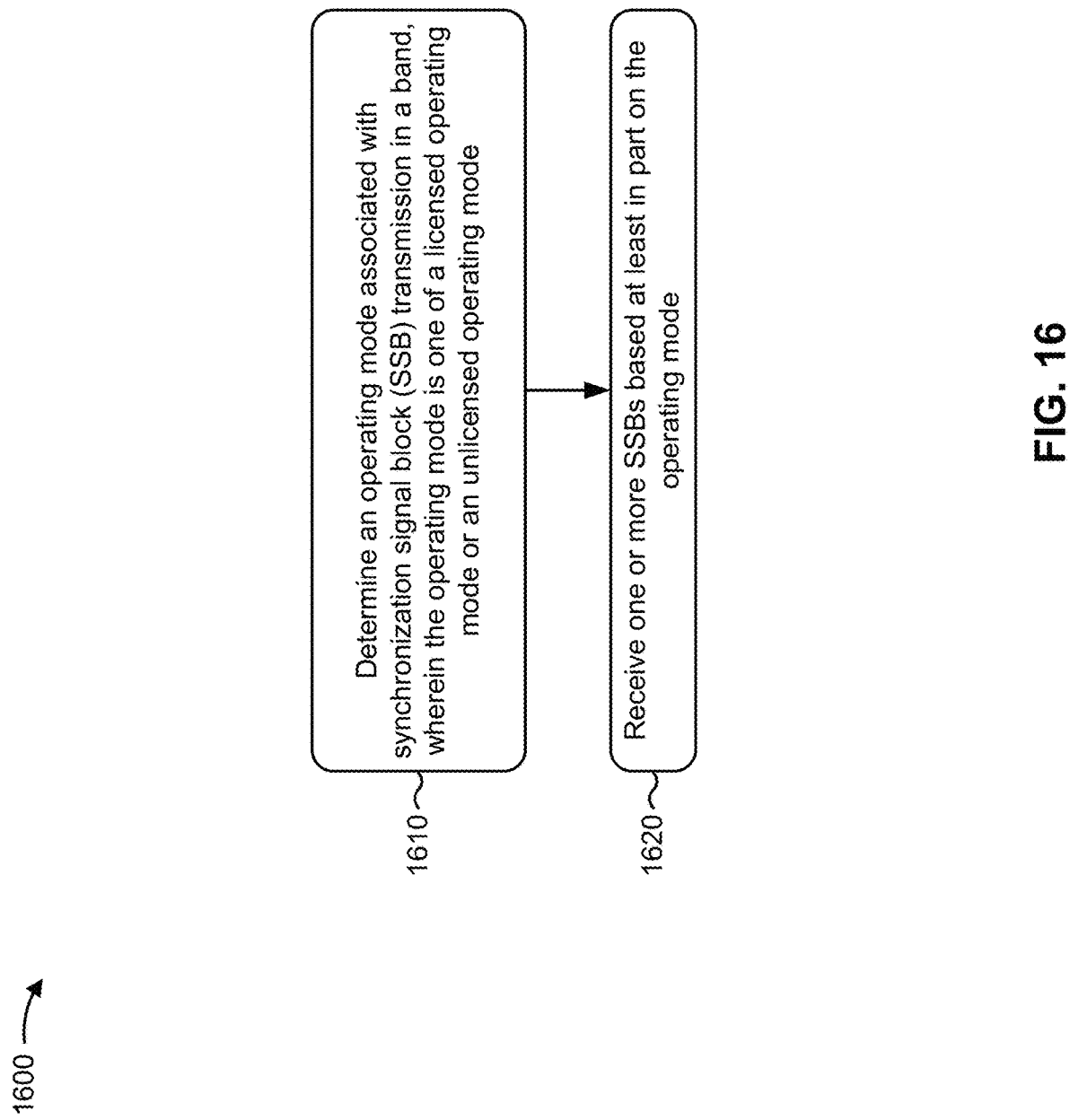
FIG. 16 is a diagram illustrating an example process performed, for example, by a user equipment, in accordance with various aspects of the present disclosure.

As shown in FIG. 16, in some aspects, process 1600 may include determining an operating mode associated with SSB transmission in a band, wherein the operating mode is one of a licensed operating mode or an unlicensed operating mode (block 1610). For example, the UE (e.g., using receive processor 258, transmit processor 264, controller/processor 280, memory 282, and/or the like) may determine an operating mode associated with SSB transmission in a band, as described above. In some aspects, the operating mode is one of a licensed operating mode or an unlicensed operating mode.

As further shown in FIG. 16, in some aspects, process 1600 may include receiving one or more SSBs based at least in part on the operating mode (block 1620). For example, the UE (e.g., using receive processor 258, controller/processor 280, memory 282, and/or the like) may receive one or more SSBs based at least in part on the operating mode, as described above.

Process 1600 may include additional aspects, such as any single aspect or any combination of aspects described below and/or in connection with one or more other processes described elsewhere herein.

In a first aspect, receiving the one or more SSBs based at least in part on the operating mode comprises: searching (e.g., using receive processor 258, controller/processor 280, memory 282, and/or the like) for SSBs in a first set of time domain resources based at least in part on determining that the SSB transmission is associated with the licensed operating mode, or searching (e.g., using receive processor 258, controller/processor 280, memory 282, and/or the like) for SSBs in a second set of time domain resources based at least in part on determining that the SSB transmission is associated with the unlicensed operating mode, and the second set of time domain resources includes a greater number of resources than the first set of time domain resources in a same discovery reference signal transmission window.

In a second aspect, alone or in combination with the first aspect, receiving the one or more SSBs based at least in part on the operating mode comprises interpreting (e.g., using receive processor 258, controller/processor 280, memory 282, and/or the like) physical broadcast channel (PBCH) content included in the one or more SSBS based at least in part on the operating mode.

In a third aspect, alone or in combination with one or more of the first and second aspects, the operating mode is determined based at least in part on an indication of the operating mode received in association with remaining minimum system information (RMSI).

In a fourth aspect, alone or in combination with one or more of the first through third aspects, the operating mode is indicated based at least in part on a physical downlink control channel (PDCCH) communication that schedules the RMSI.

In a fifth aspect, alone or in combination with one or more of the first through fourth aspects, the operating mode is indicated by at least one of: a bit in the PDCCH communication, a cyclic redundancy check mask that is used for the PDCCH communication, a radio network temporary identifier that is used for the PDCCH communication, or a combination thereof.

In a sixth aspect, alone or in combination with one or more of the first through fifth aspects, the operating mode is indicated in a payload of the RMSI.

In a seventh aspect, alone or in combination with one or more of the first through sixth aspects, the operating mode is determined based at least in part on the band, and the UE either always operates in the band using the licensed operating mode or always operates in the band using the unlicensed operating mode.

In an eighth aspect, alone or in combination with one or more of the first through seventh aspects, the operating mode is determined based at least in part on a geographic location of the UE.

In a ninth aspect, alone or in combination with one or more of the first through eighth aspects, the operating mode is determined based at least in part on a synchronization raster on which the SSB transmission occurs.

In a tenth aspect, alone or in combination with one or more of the first through ninth aspects, SSB transmission in the licensed operating mode occurs on a first set of synchronization rasters, SSB transmission in the unlicensed operating mode occurs on a second set of synchronization rasters, and the first set of synchronization rasters and the second set of synchronization rasters do not overlap.

In an eleventh aspect, alone or in combination with one or more of the first through tenth aspects, the operating mode is determined based at least in part on an SSB design.

In a twelfth aspect, alone or in combination with one or more of the first through eleventh aspects, process 1600 includes performing blind decoding (e.g., using receive processor 258, controller/processor 280, memory 282, and/or the like) on an SSB received on the band to determine the SSB design by testing multiple SSB design hypotheses.

In a thirteenth aspect, alone or in combination with one or more of the first through twelfth aspects, the operating mode is determined based at least in part on at least one of: a sequence used for a primary synchronization signal included in an SSB received on the band, a sequence used for a secondary synchronization signal included in an SSB received on the band, or a combination thereof.

In a fourteenth aspect, alone or in combination with one or more of the first through thirteenth aspects, the operating mode is determined based at least in part on a symbol placement, within an SSB received on the band, of at least one of a primary synchronization signal, a secondary synchronization signal, a physical broadcast channel, or a combination thereof.

In a fifteenth aspect, alone or in combination with one or more of the first through fourteenth aspects, the operating mode is determined based at least in part on an indication of the operating mode received in association with a PBCH communication included in an SSB received on the band.

In a sixteenth aspect, alone or in combination with one or more of the first through fifteenth aspects, the operating mode is indicated by at least one of: a bit in the PBCH communication, a cyclic redundancy check mask that is used for the PBCH communication, a scrambling parameter associated with scrambling a demodulation reference signal (DMRS) for the PBCH communication, a location of the DMRS for the PBCH communication, or a combination thereof.

In a seventeenth aspect, alone or in combination with one or more of the first through sixteenth aspects, the operating mode is determined based at least in part on an indication of the operating mode received on a primary cell, and the band is deployed within a secondary cell or within a secondary cell group.

In an eighteenth aspect, alone or in combination with one or more of the first through seventeenth aspects, the band is usable in the licensed operating mode or the unlicensed operating mode.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
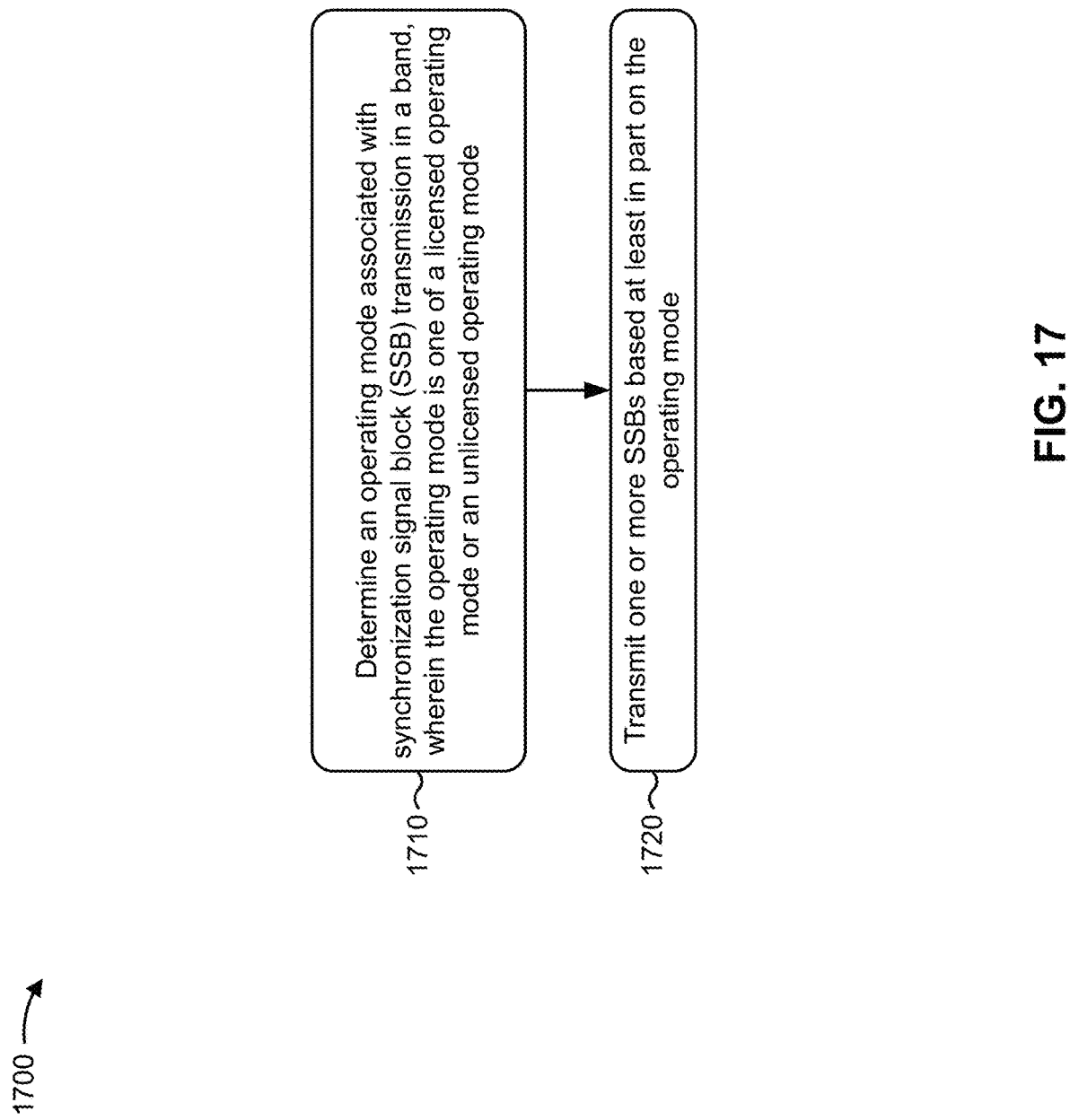
FIG. 17 is a diagram illustrating an example process performed, for example, by a base station, in accordance with various aspects of the present disclosure.

FIG. 17 is a diagram illustrating an example process 1700 performed, for example, by a base station, in accordance with various aspects of the present disclosure. Example process 1700 is an example where the base station (e.g., base station 110 and/or the like) performs operations associated with differentiating between SSB transmission in a licensed operating mode and an unlicensed operating mode.

As shown in FIG. 17, in some aspects, process 1700 may include determining an operating mode associated with SSB transmission in a band, wherein the operating mode is one of a licensed operating mode or an unlicensed operating mode (block 1710). For example, the base station (e.g., using transmit processor 220, receive processor 238, controller/processor 240, memory 242, and/or the like) may determine an operating mode associated with SSB transmission in a band, as described above. In some aspects, the operating mode is one of a licensed operating mode or an unlicensed operating mode.

As further shown in FIG. 17, in some aspects, process 1700 may include transmitting one or more SSBs based at least in part on the operating mode (block 1720). For example, the base station (e.g., using transmit processor 220, controller/processor 240, memory 242, and/or the like) may transmit one or more SSBs based at least in part on the operating mode, as described above.

Process 1700 may include additional aspects, such as any single aspect or any combination of aspects described below and/or in connection with one or more other processes described elsewhere herein.

In a first aspect, transmitting the one or more SSBs based at least in part on the operating mode comprises: transmitting (e.g., using transmit processor 220, controller/processor 240, memory 242, and/or the like) SSBs in a first set of time domain resources based at least in part on determining that the SSB transmission is associated with the licensed operating mode, or transmitting (e.g., using transmit processor 220, controller/processor 240, memory 242, and/or the like) SSBs in a second set of time domain resources based at least in part on determining that the SSB transmission is associated with the unlicensed operating mode, and the second set of time domain resources includes a greater number of resources than the first set of time domain resources in a same discovery reference signal transmission window.

In a second aspect, alone or in combination with the first aspect, transmitting the one or more SSBs based at least in part on the operating mode comprises generating (e.g., using transmit processor 220, controller/processor 240, memory 242, and/or the like) PBCH content for the one or more SSBS based at least in part on the operating mode.

In a third aspect, alone or in combination with one or more of the first and second aspects, process 1700 includes transmitting (e.g., using transmit processor 220, controller/processor 240, memory 242, and/or the like) an indication of the operating mode.

In a fourth aspect, alone or in combination with one or more of the first through third aspects, the indication of the operating mode is transmitted in association with RMSI.

In a fifth aspect, alone or in combination with one or more of the first through fourth aspects, the operating mode is indicated based at least in part on a PDCCH communication that schedules the RMSI.

In a sixth aspect, alone or in combination with one or more of the first through fifth aspects, the operating mode is indicated by at least one of: a bit in the PDCCH communication, a cyclic redundancy check mask that is used for the PDCCH communication, a radio network temporary identifier that is used for the PDCCH communication, or a combination thereof.

In a seventh aspect, alone or in combination with one or more of the first through sixth aspects, the operating mode is indicated in a payload of the RMSI.

In an eighth aspect, alone or in combination with one or more of the first through seventh aspects, the operating mode is indicated based at least in part on an SSB design.

In a ninth aspect, alone or in combination with one or more of the first through eighth aspects, the operating mode is indicated based at least in part on at least one of: a sequence used for a primary synchronization signal included in an SSB received on the band, a sequence used for a secondary synchronization signal included in an SSB received on the band, or a combination thereof.

In a tenth aspect, alone or in combination with one or more of the first through ninth aspects, the operating mode is indicated based at least in part on a symbol placement, within an SSB received on the band, of at least one of a primary synchronization signal, a secondary synchronization signal, a physical broadcast channel, or a combination thereof.

In an eleventh aspect, alone or in combination with one or more of the first through tenth aspects, the indication of the operating mode is transmitted in association with a PBCH communication included in an SSB received on the band.

In a twelfth aspect, alone or in combination with one or more of the first through eleventh aspects, the operating mode is indicated by at least one of: a bit in the PBCH communication, a cyclic redundancy check mask that is used for the PBCH communication, a scrambling parameter associated with scrambling a DMRS for the PBCH communication, a location of the DMRS for the PBCH communication, or a combination thereof.

In a thirteenth aspect, alone or in combination with one or more of the first through twelfth aspects, the indication of the operating mode is transmitted on a primary cell, and the band is deployed within a secondary cell or within a secondary cell group.

In a fourteenth aspect, alone or in combination with one or more of the first through thirteenth aspects, the operating mode is indicated based at least in part on a synchronization raster on which the SSB transmission occurs.

In a fifteenth aspect, alone or in combination with one or more of the first through fourteenth aspects, SSB transmission in the licensed operating mode occurs on a first set of synchronization rasters, SSB transmission in the unlicensed operating mode occurs on a second set of synchronization rasters, and the first set of synchronization rasters and the second set of synchronization rasters do not overlap.

In a sixteenth aspect, alone or in combination with one or more of the first through fifteenth aspects, the operating mode is determined based at least in part on the band, and the UE either always operates in the band using the licensed operating mode or always operates in the band using the unlicensed operating mode.

In a seventeenth aspect, alone or in combination with one or more of the first through sixteenth aspects, the operating mode is determined based at least in part on a geographic location of the base station.

In an eighteenth aspect, alone or in combination with one or more of the first through seventeenth aspects, the band is usable in the licensed operating mode or the unlicensed operating mode.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The following provides an overview of some aspects of the present disclosure:

Aspect 1: A method of wireless communication performed by a user equipment (UE), comprising: determining an operating mode associated with synchronization signal block (SSB) transmission in a band, wherein the operating mode is one of a licensed operating mode or an unlicensed operating mode; and receiving one or more SSBs based at least in part on the operating mode.

Aspect 2: The method of aspect 1, wherein receiving the one or more SSBs based at least in part on the operating mode comprises: searching for SSBs in a first set of time domain resources based at least in part on determining that the SSB transmission is associated with the licensed operating mode, or searching for SSBs in a second set of time domain resources based at least in part on determining that the SSB transmission is associated with the unlicensed operating mode, wherein the second set of time domain resources includes a greater number of resources than the first set of time domain resources in a same discovery reference signal transmission window.

Aspect 3: The method of any of the preceding aspects, wherein receiving the one or more SSBs based at least in part on the operating mode comprises interpreting physical broadcast channel (PBCH) content included in the one or more SSBS based at least in part on the operating mode.

Aspect 4: The method of any of the preceding aspects, wherein the operating mode is determined based at least in part on an indication of the operating mode received in association with remaining minimum system information (RMSI).

Aspect 5: The method of aspect 4, wherein the operating mode is indicated based at least in part on a physical downlink control channel (PDCCH) communication that schedules the RMSI.

Aspect 6: The method of aspect 5, wherein the operating mode is indicated by at least one of a bit in the PDCCH communication, a cyclic redundancy check mask that is used for the PDCCH communication, a radio network temporary identifier that is used for the PDCCH communication, or a combination thereof.

Aspect 7: The method of aspect 4, wherein the operating mode is indicated in a payload of the RMSI.

Aspect 8: The method of any of the preceding aspects, wherein the operating mode is determined based at least in part on the band, wherein the UE either always operates in the band using the licensed operating mode or always operates in the band using the unlicensed operating mode.

Aspect 9: The method of any of the preceding aspects, wherein the operating mode is determined based at least in part on a geographic location of the UE.

Aspect 10: The method of any of the preceding aspects, wherein the operating mode is determined based at least in part on a synchronization raster on which the SSB transmission occurs.

Aspect 11: The method of aspect 10, wherein SSB transmission in the licensed operating mode occurs on a first set of synchronization rasters and SSB transmission in the unlicensed operating mode occurs on a second set of synchronization rasters, wherein the first set of synchronization rasters and the second set of synchronization rasters do not overlap.

Aspect 12: The method of any of the preceding aspects, wherein the operating mode is determined based at least in part on an SSB design.

Aspect 13: The method of aspect 12, further comprising performing blind decoding on an SSB received on the band to determine the SSB design by testing multiple SSB design hypotheses.

Aspect 14: The method of any of the preceding aspects, wherein the operating mode is determined based at least in part on at least one of: a sequence used for a primary synchronization signal included in an SSB received on the band, a sequence used for a secondary synchronization signal included in an SSB received on the band, or a combination thereof.

Aspect 15: The method of any of the preceding aspects, wherein the operating mode is determined based at least in part on a symbol placement, within an SSB received on the band, of at least one of a primary synchronization signal, a secondary synchronization signal, a physical broadcast channel, or a combination thereof.

Aspect 16: The method of any of the preceding aspects, wherein the operating mode is determined based at least in part on an indication of the operating mode received in association with a physical broadcast channel (PBCH) communication included in an SSB received on the band.

Aspect 17: The method of aspect 16, wherein the operating mode is indicated by at least one of: a bit in the PBCH communication, a cyclic redundancy check mask that is used for the PBCH communication, a scrambling parameter associated with scrambling a demodulation reference signal (DMRS) for the PBCH communication, a location of the DMRS for the PBCH communication, or a combination thereof.

Aspect 18: The method of any of the preceding aspects, wherein the operating mode is determined based at least in part on an indication of the operating mode received on a primary cell, wherein the band is deployed within a secondary cell or within a secondary cell group.

Aspect 19: The method of any of the preceding aspects, wherein the band is usable in the licensed operating mode or the unlicensed operating mode.

Aspect 20: A method of wireless communication performed by a base station, comprising: determining an operating mode associated with synchronization signal block (SSB) transmission in a band, wherein the operating mode is one of a licensed operating mode or an unlicensed operating mode; and transmitting one or more SSBs based at least in part on the operating mode.

Aspect 21: The method of aspect 20, wherein transmitting the one or more SSBs based at least in part on the operating mode comprises: transmitting SSBs in a first set of time domain resources based at least in part on determining that the SSB transmission is associated with the licensed operating mode, or transmitting SSBs in a second set of time domain resources based at least in part on determining that the SSB transmission is associated with the unlicensed operating mode, wherein the second set of time domain resources includes a greater number of resources than the first set of time domain resources in a same discovery reference signal transmission window.

Aspect 22: The method of any of aspects 20-21, wherein transmitting the one or more SSBs based at least in part on the operating mode comprises generating physical broadcast channel (PBCH) content for the one or more SSBS based at least in part on the operating mode.

Aspect 23: The method of any of aspects 20-22, further comprising transmitting an indication of the operating mode.

Aspect 24: The method of aspect 23, wherein the indication of the operating mode is transmitted in association with remaining minimum system information (RMSI).

Aspect 25: The method of aspect 24, wherein the operating mode is indicated based at least in part on a physical downlink control channel (PDCCH) communication that schedules the RMSI.

Aspect 26: The method of aspect 25, wherein the operating mode is indicated by at least one of: a bit in the PDCCH communication, a cyclic redundancy check mask that is used for the PDCCH communication, a radio network temporary identifier that is used for the PDCCH communication, or a combination thereof.

Aspect 27: The method of aspect 24, wherein the operating mode is indicated in a payload of the RMSI.

Aspect 28: The method of any of aspects 23-27, wherein the operating mode is indicated based at least in part on an SSB design.

Aspect 29: The method of any of aspects 23-28, wherein the operating mode is indicated based at least in part on at least one of: a sequence used for a primary synchronization signal included in an SSB received on the band, a sequence used for a secondary synchronization signal included in an SSB received on the band, or a combination thereof.

Aspect 30: The method of any of aspects 23-29, wherein the operating mode is indicated based at least in part on a symbol placement, within an SSB received on the band, of at least one of a primary synchronization signal, a secondary synchronization signal, a physical broadcast channel, or a combination thereof.

Aspect 31: The method of any of aspects 23-30, wherein the indication of the operating mode is transmitted in association with a physical broadcast channel (PBCH) communication included in an SSB received on the band.

Aspect 32: The method of aspect 31, wherein the operating mode is indicated by at least one of: a bit in the PBCH communication, a cyclic redundancy check mask that is used for the PBCH communication, a scrambling parameter associated with scrambling a demodulation reference signal (DMRS) for the PBCH communication, a location of the DMRS for the PBCH communication, or a combination thereof.

Aspect 33: The method of any of aspects 23-32, wherein the indication of the operating mode is transmitted on a primary cell, wherein the band is deployed within a secondary cell or within a secondary cell group.

Aspect 34: The method of any of aspects 23-33, wherein the operating mode is indicated based at least in part on a synchronization raster on which the SSB transmission occurs.

Aspect 35: The method of aspect 34, wherein SSB transmission in the licensed operating mode occurs on a first set of synchronization rasters and SSB transmission in the unlicensed operating mode occurs on a second set of synchronization rasters, wherein the first set of synchronization rasters and the second set of synchronization rasters do not overlap.

Aspect 36: The method of any of aspects 20-35, wherein the operating mode is determined based at least in part on the band, wherein the UE either always operates in the band using the licensed operating mode or always operates in the band using the unlicensed operating mode.

Aspect 37: The method of any of aspects 20-36, wherein the operating mode is determined based at least in part on a geographic location of the base station.

Aspect 38: The method of any of aspects 20-37, wherein the band is usable in the licensed operating mode or the unlicensed operating mode.

Aspect 36: An apparatus for wireless communication at a device, comprising a processor: memory coupled with the processor; and instructions stored in the memory and executable by the processor to cause the apparatus to perform the method of one or more aspects of aspects 1-19.

Aspect 37: A device for wireless communication, comprising a memory and one or more processors coupled to the memory, the memory and the one or more processors configured to perform the method of one or more aspects of aspects 1-19.

Aspect 38: An apparatus for wireless communication, comprising at least one means for performing the method of one or more aspects of aspects 1-19.

Aspect 39: A non-transitory computer-readable medium storing code for wireless communication, the code comprising instructions executable by a processor to perform the method of one or more aspects of aspects 1-19.

Aspect 40: A non-transitory computer-readable medium storing a set of instructions for wireless communication, the set of instructions comprising one or more instructions that, when executed by one or more processors of a device, cause the device to perform the method of one or more aspects of aspects 1-19.

Aspect 41: An apparatus for wireless communication at a device, comprising a processor; memory coupled with the processor; and instructions stored in the memory and executable by the processor to cause the apparatus to perform the method of one or more aspects of aspects 20-38.

Aspect 42: A device for wireless communication, comprising a memory and one or more processors coupled to the memory, the memory and the one or more processors configured to perform the method of one or more aspects of aspects 20-38

Aspect 43: An apparatus for wireless communication, comprising at least one means for performing the method of one or more aspects of aspects 20-38.

Aspect 44: A non-transitory computer-readable medium storing code for wireless communication, the code comprising instructions executable by a processor to perform the method of one or more aspects of aspects 20-38.

Aspect 45: A non-transitory computer-readable medium storing a set of instructions for wireless communication, the set of instructions comprising one or more instructions that, when executed by one or more processors of a device, cause the device to perform the method of one or more aspects of aspects 20-38.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
a memory; and
one or more processors coupled to the memory, the memory and the one or more processors configured to:
determine an operating mode associated with synchronization signal block (SSB) transmission in a band, wherein the operating mode is one of a licensed operating mode or an unlicensed operating mode; and
receive one or more SSBs in a set of time domain resources associated with a set of SSB candidate positions, wherein the set of SSB candidate positions are based at least in part on the operating mode.

2. The UE of claim 1, wherein the one or more processors, when receiving the one or more SSBs based at least in part on the operating mode, are configured to:
   search for SSBs in a first set of time domain resources based at least in part on determining that the SSB transmission is associated with the licensed operating mode, or
   search for SSBs in a second set of time domain resources based at least in part on determining that the SSB transmission is associated with the unlicensed operating mode, wherein the second set of time domain resources includes a greater number of resources than the first set of time domain resources in a same discovery reference signal transmission window.

3. The UE of claim 1, wherein the one or more processors, when receiving the one or more SSBs based at least in part on the operating mode, are configured to interpret physical broadcast channel (PBCH) content included in the one or more SSBs based at least in part on the operating mode.

4. The UE of claim 1, wherein the operating mode is determined based at least in part on an indication of the operating mode received in association with remaining minimum system information (RMSI).

5. The UE of claim 4, wherein the operating mode is indicated based at least in part on a physical downlink control channel (PDCCH) communication that schedules the RMSI.

6. The UE of claim 5, wherein the operating mode is indicated by at least one of:
   a bit in the PDCCH communication,
   a cyclic redundancy check mask that is used for the PDCCH communication,
   a radio network temporary identifier that is used for the PDCCH communication, or
   a combination thereof.

7. The UE of claim 4, wherein the operating mode is indicated in a payload of the RMSI.

8. The UE of claim 1, wherein the operating mode is determined based at least in part on the band, wherein the UE either always operates in the band using the licensed operating mode or always operates in the band using the unlicensed operating mode.

9. The UE of claim 1, wherein the operating mode is determined based at least in part on a geographic location of the UE.

10. The UE of claim 1, wherein the operating mode is determined based at least in part on a synchronization raster on which the SSB transmission occurs.

11. The UE of claim 10, wherein SSB transmission in the licensed operating mode occurs on a first set of synchronization rasters and SSB transmission in the unlicensed operating mode occurs on a second set of synchronization rasters, wherein the first set of synchronization rasters and the second set of synchronization rasters do not overlap.

12. The UE of claim 1, wherein the operating mode is determined based at least in part on an SSB design.

13. The UE of claim 12, wherein the one or more processors are further configured to perform blind decoding on an SSB received on the band to determine the SSB design by testing multiple SSB design hypotheses.

14. The UE of claim 1, wherein the operating mode is determined based at least in part on at least one of:
   a sequence used for a primary synchronization signal included in an SSB received on the band,
   a sequence used for a secondary synchronization signal included in an SSB received on the band, or
   a combination thereof.

15. The UE of claim 1, wherein the operating mode is determined based at least in part on a symbol placement, within an SSB received on the band, of at least one of a primary synchronization signal, a secondary synchronization signal, a physical broadcast channel, or a combination thereof.

16. The UE of claim 1, wherein the operating mode is determined based at least in part on an indication of the operating mode received in association with a physical broadcast channel (PBCH) communication included in an SSB received on the band.

17. The UE of claim 16, wherein the operating mode is indicated by at least one of:
   a bit in the PBCH communication,
   a cyclic redundancy check mask that is used for the PBCH communication,
   a scrambling parameter associated with scrambling a demodulation reference signal (DMRS) for the PBCH communication,
   a location of the DMRS for the PBCH communication, or
   a combination thereof.

18. The UE of claim 1, wherein the operating mode is determined based at least in part on an indication of the operating mode received on a primary cell, wherein the band is deployed within a secondary cell or within a secondary cell group.

19. The UE of claim 1, wherein the band is usable in the licensed operating mode or the unlicensed operating mode.

20. A base station for wireless communication, comprising:
   a memory; and
   one or more processors coupled to the memory, the memory and the one or more processors configured to:
      determine an operating mode associated with synchronization signal block (SSB) transmission in a band, wherein the operating mode is one of a licensed operating mode or an unlicensed operating mode; and
      transmit one or more SSBs in a set of time domain resources associated with a set of SSB candidate positions, wherein the set of SSB candidate positions are based at least in part on the operating mode.

21. The base station of claim 20, wherein the one or more processors, when transmitting the one or more SSBs based at least in part on the operating mode, are configured to:
   transmit SSBs in a first set of time domain resources based at least in part on determining that the SSB transmission is associated with the licensed operating mode, or
   transmit SSBs in a second set of time domain resources based at least in part on determining that the SSB transmission is associated with the unlicensed operating mode, wherein the second set of time domain resources includes a greater number of resources than the first set of time domain resources in a same discovery reference signal transmission window.

22. The base station of claim 20, wherein the one or more processors, when transmitting the one or more SSBs based at least in part on the operating mode, are configured to generate physical broadcast channel (PBCH) content for the one or more SSBs based at least in part on the operating mode.

23. The base station of claim 20, wherein the one or more processors are further configured to transmit an indication of the operating mode.

24. The base station of claim 23, wherein the indication of the operating mode is transmitted in association with at least one of:

remain minimum system information (RMSI),
a physical broadcast channel (PBCH) communication included in an SSB received on the band, or
a combination thereof.

25. The base station of claim 23, wherein the operating mode is indicated based at least in part on at least one of:
an SSB design,
a synchronization raster on which the SSB transmission occurs,
a sequence used for a primary synchronization signal included in an SSB received on the band,
a sequence used for a secondary synchronization signal included in an SSB received on the band,
a symbol placement, within an SSB received on the band, of at least one of the primary synchronization signal, the secondary synchronization signal, or a physical broadcast channel, or
a combination thereof.

26. The base station of claim 20, wherein the operating mode is determined based at least in part on the band, wherein the base station either always operates in the band using the licensed operating mode or always operates in the band using the unlicensed operating mode.

27. The base station of claim 20, wherein the operating mode is determined based at least in part on a geographic location of the base station.

28. The base station of claim 20, wherein the band is usable in the licensed operating mode or the unlicensed operating mode.

29. A method of wireless communication performed by a user equipment (UE), comprising:
determining an operating mode associated with synchronization signal block (SSB) transmission in a band, wherein the operating mode is one of a licensed operating mode or an unlicensed operating mode; and
receiving one or more SSBs in a set of time domain resources associated with a set of SSB candidate positions, wherein the set of SSB candidate positions are based at least in part on the operating mode.

30. A method of wireless communication performed by a base station, comprising:
determining an operating mode associated with synchronization signal block (SSB) transmission in a band, wherein the operating mode is one of a licensed operating mode or an unlicensed operating mode; and
transmitting one or more SSBs in a set of time domain resources associated with a set of SSB candidate positions, wherein the set of SSB candidate positions are based at least in part on the operating mode.

* * * * *